United States Patent
Vandwalle et al.

(10) Patent No.: US 9,391,853 B2
(45) Date of Patent: Jul. 12, 2016

(54) EFFICIENT SERVICE ADVERTISEMENT AND DISCOVERY IN A PEER-TO-PEER NETWORKING ENVIRONMENT WITH DYNAMIC ADVERTISEMENT AND DISCOVERY PERIODS BASED ON OPERATING CONDITIONS

(75) Inventors: Pierre Vandwalle, Sunnyvale, CA (US); Tito Thomas, San Jose, CA (US); Charles Francis Dominguez, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1161 days.

(21) Appl. No.: 12/796,522

(22) Filed: Jun. 8, 2010

(65) Prior Publication Data

US 2011/0153789 A1   Jun. 23, 2011

Related U.S. Application Data

(60) Provisional application No. 61/289,689, filed on Dec. 23, 2009.

(51) Int. Cl.
*G06F 15/177* (2006.01)
*H04L 12/26* (2006.01)
(Continued)

(52) U.S. Cl.
CPC ...... *H04L 43/04* (2013.01); *G06F 1/32* (2013.01); *H04L 67/16* (2013.01);
(Continued)

(58) Field of Classification Search
CPC ..... H04W 48/08; H04W 48/05; H04W 48/10; H04W 8/05; H04N 21/00; H04N 21/458; G06Q 30/0241; G06Q 30/0242; G06Q 30/0266; G06Q 30/0267; G06Q 30/0271; H04L 43/04; H04L 67/16; H04L 67/2861; G06F 1/32
USPC ............... 713/324; 370/254, 338; 705/14.43, 705/14.51; 709/221, 222
See application file for complete search history.

(56) References Cited

U.S. PATENT DOCUMENTS

| | | | |
|---|---|---|---|
| 5,862,325 | A | 1/1999 | Reed et al. |
| 6,532,368 | B1 | 3/2003 | Hild et al. |

(Continued)

FOREIGN PATENT DOCUMENTS

| | | | |
|---|---|---|---|
| CN | 101350778 A | | 1/2009 |
| CN | 101444131 A | | 5/2009 |

(Continued)

OTHER PUBLICATIONS

Ververidis CN et al., "Service Discovery for Mobile Ad Hoc Networks: a Survey of Issues and Techniques", IEEE Communications Surveys, IEEE, New York, NY, US, vol. 10, No. 3, Jul. 1, 2008, pp. 30-45, XP011234560.

(Continued)

*Primary Examiner* — Thu Ha Nguyen
(74) *Attorney, Agent, or Firm* — Sterne, Kessler, Goldstein & Fox P.L.L.C.

(57) ABSTRACT

A local device is configured to monitor operating conditions coupled to a wireless network. An advertisement period is dynamically adjusted based on the operating conditions of the local device, where the advertisement period is dynamically adjusted based on at least one of a battery condition of the local device, a user behavior of the local device, network traffic condition, and a type of service to be advertised. The local device broadcasts a service advertisement in the wireless network according to the adjusted advertisement period, the service advertisement including one or more service IDs for identifying one or more services to be advertised from the local device.

21 Claims, 18 Drawing Sheets

(51) Int. Cl.
- *H04W 8/00* (2009.01)
- *H04W 48/08* (2009.01)
- *H04L 29/08* (2006.01)
- *G06F 1/32* (2006.01)
- *H04W 4/00* (2009.01)
- *H04W 52/02* (2009.01)
- *H04W 84/18* (2009.01)
- *H04W 92/18* (2009.01)

(52) U.S. Cl.
CPC ......... *H04L 67/2861* (2013.01); *H04L 67/325* (2013.01); *H04W 8/005* (2013.01); *H04W 48/08* (2013.01); *H04W 4/00* (2013.01); *H04W 52/02* (2013.01); *H04W 52/0216* (2013.01); *H04W 84/18* (2013.01); *H04W 92/18* (2013.01); *Y02B 60/50* (2013.01)

(56) References Cited

U.S. PATENT DOCUMENTS

| | | | |
|---|---|---|---|
| 6,604,140 | B1 | 8/2003 | Beck et al. |
| 6,691,169 | B1 | 2/2004 | D'Souza |
| 6,775,244 | B1 | 8/2004 | Hattig |
| 6,829,475 | B1 * | 12/2004 | Lee et al. ................. 455/419 |
| 6,961,560 | B2 | 11/2005 | Hermann et al. |
| 7,085,814 | B1 | 8/2006 | Gandhi et al. |
| 7,237,007 | B2 | 6/2007 | Kamath et al. |
| 7,249,182 | B1 | 7/2007 | Heinonen et al. |
| 7,263,560 | B2 | 8/2007 | Abdelaziz et al. |
| 7,349,965 | B1 | 3/2008 | Graupner et al. |
| 7,383,574 | B2 | 6/2008 | Burrows et al. |
| 7,426,393 | B2 | 9/2008 | Paila |
| 7,428,229 | B2 | 9/2008 | Bonta et al. |
| 7,457,973 | B2 | 11/2008 | Liu |
| 7,525,974 | B2 | 4/2009 | Mancour |
| 7,526,278 | B2 | 4/2009 | Link, II et al. |
| 7,533,161 | B2 | 5/2009 | Hugly et al. |
| 7,533,172 | B2 | 5/2009 | Traversat et al. |
| 7,586,864 | B2 | 9/2009 | Aoki |
| 7,590,086 | B2 | 9/2009 | Olkkonen et al. |
| 7,600,137 | B2 | 10/2009 | Trappeniers et al. |
| RE40,985 | E | 11/2009 | Hermann |
| 7,613,156 | B2 | 11/2009 | Rittle et al. |
| 7,613,426 | B2 | 11/2009 | Kuehnel et al. |
| 7,623,472 | B2 | 11/2009 | Samanta et al. |
| 7,711,004 | B2 | 5/2010 | Xu |
| 7,756,094 | B2 | 7/2010 | Ho |
| 7,760,676 | B2 | 7/2010 | Demirhan et al. |
| 7,774,495 | B2 | 8/2010 | Pabla et al. |
| 7,836,164 | B2 | 11/2010 | Tawfik |
| 7,848,263 | B2 | 12/2010 | Chhabra |
| 7,920,849 | B2 * | 4/2011 | Pop ............................ 455/414.1 |
| 7,957,483 | B2 | 6/2011 | Yu et al. |
| 7,987,241 | B2 | 7/2011 | St. Jacques et al. |
| 8,032,072 | B2 | 10/2011 | Thibodeau et al. |
| 8,051,463 | B2 | 11/2011 | Thawani et al. |
| 8,073,014 | B2 | 12/2011 | Carbunar et al. |
| 8,108,455 | B2 | 1/2012 | Yeager et al. |
| 8,131,281 | B1 | 3/2012 | Hildner et al. |
| 8,194,576 | B2 | 6/2012 | Kholaif et al. |
| 8,229,888 | B1 | 7/2012 | Roskind et al. |
| 8,281,025 | B2 | 10/2012 | Preimesberger |
| 8,316,082 | B2 | 11/2012 | Igarashi |
| 8,320,288 | B2 | 11/2012 | Sakoda |
| 8,327,178 | B2 * | 12/2012 | Vandwalle et al. ........... 713/324 |
| 8,369,800 | B2 | 2/2013 | Li et al. |
| 8,370,657 | B2 | 2/2013 | Kuroishi et al. |
| 8,423,093 | B2 | 4/2013 | Ren |
| 8,458,500 | B2 | 6/2013 | Akers et al. |
| 8,478,820 | B2 | 7/2013 | Michaelis et al. |
| 8,533,507 | B2 | 9/2013 | Vandwalle et al. |
| 8,553,623 | B2 | 10/2013 | Buer et al. |
| 8,583,753 | B1 | 11/2013 | Bhagwatula et al. |
| 8,588,816 | B2 * | 11/2013 | Collins ....................... 455/456.3 |
| 8,601,127 | B2 | 12/2013 | Lim et al. |
| 8,634,796 | B2 | 1/2014 | Johnson |
| 8,700,105 | B2 | 4/2014 | Lee et al. |
| 8,797,930 | B2 | 8/2014 | Wentink |
| 8,819,219 | B2 | 8/2014 | Vandwalle et al. |
| 8,897,741 | B2 | 11/2014 | Johnson |
| 8,942,118 | B2 | 1/2015 | Omori |
| 8,971,955 | B2 | 3/2015 | Chin et al. |
| 9,054,889 | B2 | 6/2015 | Jung et al. |
| 9,088,946 | B2 | 7/2015 | Wentink |
| 2002/0152299 | A1 | 10/2002 | Traversat et al. |
| 2004/0003058 | A1 | 1/2004 | Trossen |
| 2004/0024912 | A1 | 2/2004 | Fukao et al. |
| 2004/0064512 | A1 | 4/2004 | Auora et al. |
| 2004/0148326 | A1 | 7/2004 | Nadgir et al. |
| 2004/0203890 | A1 | 10/2004 | Karaoguz et al. |
| 2005/0078644 | A1 | 4/2005 | Tsai et al. |
| 2005/0128958 | A1 | 6/2005 | Hamdan |
| 2005/0177616 | A1 | 8/2005 | Addington et al. |
| 2006/0116819 | A1 * | 6/2006 | Soundararajan ................ 701/213 |
| 2006/0172697 | A1 * | 8/2006 | Gallego et al. ................ 455/3.01 |
| 2006/0212592 | A1 | 9/2006 | Gupta et al. |
| 2006/0258341 | A1 | 11/2006 | Miller et al. |
| 2007/0037589 | A1 | 2/2007 | Watson et al. |
| 2007/0043591 | A1 | 2/2007 | Meretei et al. |
| 2007/0079324 | A1 | 4/2007 | Hallford et al. |
| 2007/0207733 | A1 * | 9/2007 | Wong et al. ................... 455/41.1 |
| 2007/0250726 | A1 | 10/2007 | Rossetti et al. |
| 2007/0264991 | A1 | 11/2007 | Jones et al. |
| 2007/0286100 | A1 | 12/2007 | Saaranen et al. |
| 2007/0286136 | A1 * | 12/2007 | Rittle et al. ................... 370/338 |
| 2008/0016203 | A1 | 1/2008 | Song et al. |
| 2008/0052340 | A1 | 2/2008 | Hallmark et al. |
| 2008/0069062 | A1 * | 3/2008 | Li et al. ....................... 370/338 |
| 2008/0130639 | A1 | 6/2008 | Costa-Requena et al. |
| 2008/0195664 | A1 | 8/2008 | Maharajh et al. |
| 2008/0235112 | A1 | 9/2008 | Montoya |
| 2008/0316941 | A1 | 12/2008 | Jung et al. |
| 2009/0029728 | A1 | 1/2009 | Shen et al. |
| 2009/0047942 | A1 | 2/2009 | Cao |
| 2009/0088183 | A1 | 4/2009 | Piersol et al. |
| 2009/0161579 | A1 * | 6/2009 | Saaranen et al. ................ 370/254 |
| 2009/0222530 | A1 | 9/2009 | Buford et al. |
| 2009/0240794 | A1 | 9/2009 | Liu et al. |
| 2009/0248503 | A1 * | 10/2009 | Fisher et al. .................... 705/14 |
| 2009/0274082 | A1 | 11/2009 | Wentink |
| 2009/0274083 | A1 | 11/2009 | Wentink |
| 2009/0307307 | A1 | 12/2009 | Igarashi |
| 2010/0010899 | A1 | 1/2010 | Lambert et al. |
| 2010/0112990 | A1 * | 5/2010 | Dingler et al. .............. 455/414.2 |
| 2010/0138007 | A1 | 6/2010 | Clark et al. |
| 2010/0162298 | A1 | 6/2010 | Ahn |
| 2010/0191552 | A1 | 7/2010 | Behrens et al. |
| 2010/0233960 | A1 | 9/2010 | Tucker et al. |
| 2010/0254308 | A1 | 10/2010 | Laroia et al. |
| 2010/0306249 | A1 * | 12/2010 | Hill et al. ...................... 707/769 |
| 2011/0040888 | A1 | 2/2011 | Krishnaswamy et al. |
| 2011/0153773 | A1 | 6/2011 | Vandwalle et al. |
| 2012/0095845 | A1 * | 4/2012 | Shani .......................... 705/14.71 |
| 2012/0143383 | A1 * | 6/2012 | Cooperrider et al. ......... 700/295 |
| 2012/0162013 | A1 | 6/2012 | Piersol et al. |
| 2012/0185325 | A1 * | 7/2012 | Shani .......................... 705/14.43 |
| 2012/0197715 | A1 * | 8/2012 | Shani .......................... 705/14.51 |
| 2013/0055326 | A1 | 2/2013 | Lu et al. |
| 2013/0055358 | A1 | 2/2013 | Short et al. |
| 2013/0132502 | A1 | 5/2013 | Stacey et al. |
| 2013/0166703 | A1 | 6/2013 | Hammer et al. |
| 2013/0312065 | A1 | 11/2013 | Abeyweera |
| 2013/0317892 | A1 | 11/2013 | Heerboth |
| 2013/0322297 | A1 | 12/2013 | Dominguez |
| 2014/0006129 | A1 * | 1/2014 | Heath .......................... 705/14.23 |
| 2014/0059369 | A1 | 2/2014 | Vandwalle et al. |
| 2014/0086134 | A1 | 3/2014 | Smadi et al. |
| 2014/0165094 | A1 | 6/2014 | Hardy |
| 2015/0109961 | A1 | 4/2015 | Patil et al. |

(56) References Cited

U.S. PATENT DOCUMENTS

FOREIGN PATENT DOCUMENTS

| | | | |
|---|---|---|---|
| CN | 101473563 | A | 7/2009 |
| EP | 1022876 | A1 | 7/2000 |
| EP | 1162839 | A2 | 12/2001 |
| EP | 2023680 | A1 | 2/2009 |
| JP | 2002-186009 | | 6/2002 |
| JP | 2005-130436 | | 5/2005 |
| JP | 2010-530648 | | 9/2010 |
| WO | WO 2006/034563 | A1 | 4/2006 |
| WO | WO 2007/044597 | A2 | 1/2007 |
| WO | WO 2007/102479 | A1 | 9/2007 |
| WO | WO 2007/133526 | A2 | 11/2007 |
| WO | WO 2008/149598 | A1 | 12/2008 |

OTHER PUBLICATIONS

Joseph Borg, *A Comparative Study of Ad Hoc Peer to Peer Networks*, A dissertation submitted in partial fulfilment of the requirements for the degree of Master of Science in Telecommunications at the University College, London, 170 pages, Aug. 2003.

English language abstract of Japanese Patent Publication No. JP 2002-186009, published Jun. 28, 2002, retrieved from http://worldwide.espacenet.com, 1 page.

\* cited by examiner

EFFICIENT SERVICE ADVERTISEMENT AND DISCOVERY IN A PEER-TO-PEER NETWORKING ENVIRONMENT WITH DYNAMIC ADVERTISEMENT AND DISCOVERY PERIODS BASED ON OPERATING CONDITIONS

RELATED APPLICATIONS

This application claims the priority of U.S. Provisional Patent Application No. 61/289,689, filed Dec. 23, 2009, which is incorporated by reference herein in its entirety.

FIELD OF THE INVENTION

Embodiments of the invention relate generally to the field of peer-to-peer networking; and more particularly, to service advertisement and service discovery in a peer-to-peer networking environment.

BACKGROUND

Devices such as electronic devices, computing systems, portable devices, and handheld devices have software applications such as game applications. Some of these applications are shared—for instance, multiple devices can participate in a game application in a collaborative fashion. The shared features of an application can be referred to as services. Before a device can use a service offered by another device, the participating device (the discoverer) has to discover such a service available on a network. Services are advertised by a remote device (i.e. the advertiser) on the network.

Various discovery techniques are available for electronic devices connected to, or attempting to connect to a network. These discovery techniques typically involve use of a network protocol to determine what devices and/or services are available through a network connection. These discovery techniques are useful for many situations. However, in certain situations, these discovery techniques are not optimal.

Typically, each device in a network is configured to periodically scan and/or advertise a service in the network according to commonly known scanning and advertising schedule, such as, for example, in a 100 millisecond (ms)-800 ms period range. When there are many devices in the network closely located, such a scanning and/or advertising strategy may not be efficient as there may be heavy communications channel congestion, which results in devices taking a long period of time to discover a service of another device and/or to advertise a service. In such a scenario, additional time would need to be spent scanning to ensure reliable service discovery. Spending additional time scanning consumes a larger amount of power, which is a critical resource on a portable electronic device. Further, frequent discovery scanning and advertisement transmission may themselves consume more power, which is important to a portable device. There has been a lack of efficient way to optimize the service discovery and/or advertisement for portable devices.

SUMMARY OF THE DESCRIPTION

According to some embodiments, a service discovery and advertisement mechanism is utilized to enable a device (e.g., electronic portable device such as a notebook, cellular/smart phone, media player, a personal digital assistant (PDA), or a combination thereof) to efficiently discover and/or advertise one or more services in a wireless network (e.g., IEEE 802.11 or WiFi, personal area network such as Bluetooth compliant network).

In one embodiment, when a first device advertises one or more services in a wireless network, the first device broadcasts or multicasts an advertisement message (also simply referred to as an advertisement) in the network, where the advertisement includes one or more service identifiers (e.g., hashes), each identifying a particular service potentially available from the first device. The advertisement further includes information regarding availability, such as an availability schedule, of the first device in which the first device will listen on the network for any service requests about the advertisement. Thereafter, the first device may turn off or reduce power for at least a portion, such as a radio frequency (RF) portion (e.g., transceiver, antenna), of the first device until a subsequent certain time period according to the availability information (e.g., availability schedule). Alternatively, the first device can perform some other tasks during that time period.

When a second device on the network receives the advertisement, the second device can determine whether it is interested in acquiring one or more of the services advertised from the first device based on the service identifiers in the advertisement. If interested, the second device can transmit a service request to the first device using the availability information of the first device, where the service request includes the service identifier of one or more selected services. For example, the second device may transmit the service request according to the availability schedule of the first device (e.g., during the first device's availability window when the first device is listening). In response to the service request, the first device can transmit more detailed information about the requested services to the second device.

According to another embodiment, each device in the network is configured to monitor the operating environment of the respective device as well as network traffic in the network. Based on the result of the monitoring, a device may adjust its advertisement period and/or service discovery period dynamically. For example, if a device has a little battery life remaining, the device may reduce the frequency of the service advertisements and service discovery (e.g., increase the service advertisement and/or discovery periods). As another example, if it is determined that communications channel congestion is relatively high, for example, due to a large number of devices in the network, a device may also adjust the service advertisement and/or discovery periods accordingly (e.g., increase the service advertisement and/or discovery periods to avoid congestion collapse of the network).

In one embodiment, the service advertisement period and/or service discovery period are calculated based on multiples of a predetermined base value. However, the service discovery period is configured not to be multiples of the service advertisement period, or vice versa. As a result, an advertiser and/or a discoverer can calculate their own service advertisement period and/or service discovery period independently; but an advertisement from an advertiser will still be captured by a discoverer over a period of time dependent upon the specific calculation of the service advertisement period and/or service discovery period.

According to a further embodiment, multiple devices that are capable of advertising one or more services may coordinate with each other to select one or more of devices to advertise the services on behalf of other devices. Such a device acts as a group advertiser. A device may be selected as a group advertiser according to a variety of parameters (e.g., a battery condition, etc.), which are monitored by the monitoring logic of the respective device. A device may operate as an advertiser that advertises its own services and/or a group advertiser that advertises services of other devices in the network. A device may also operate as an advertiser for advertising its own services, as well as being an advertisee having one or more of its own services to be advertised by another device. A device may also operate as an advertisee only that relies on another device for advertising its services.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
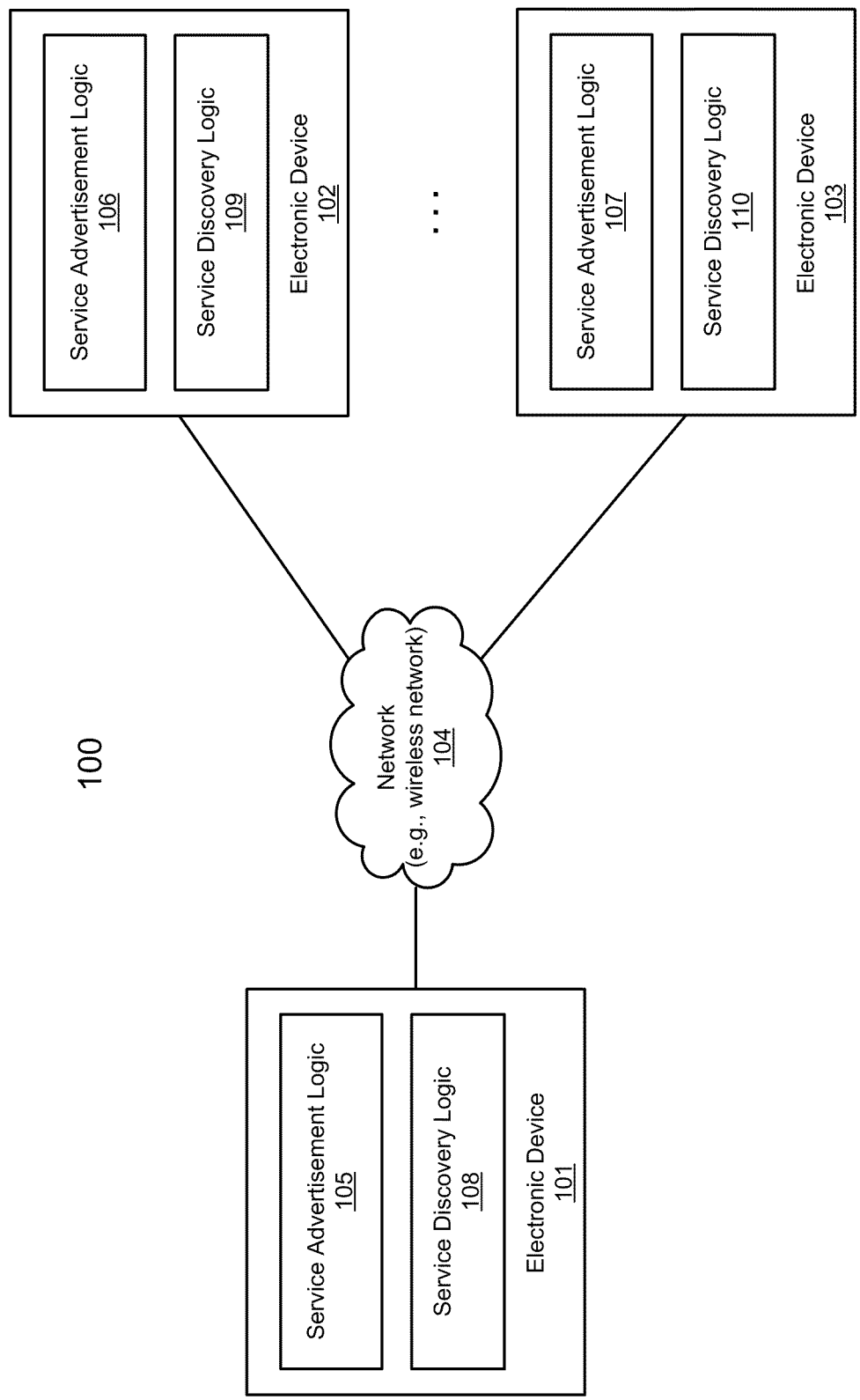
FIG. 1 is a network configuration which may be implemented with an embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Definitions

Advertiser—a device advertising one or more of its own services.

Group advertiser—a device advertising one or more services on behalf of one or more other devices. Group advertisers also advertise their own services, if they have any.

Advertisee—a device whose services are being advertised by another device on the network (i.e. by a group advertiser, not including itself).

Discoverer—a device that is trying to discover one or more services on the network.

Availability Window—a period of time in which an device is available and listening on the network, and is capable of responding to service discovery requests, advertisement requests, and other requests.

Availability Schedule—the times in which a device will be available to respond to service requests. Included in advertisement messages, this indicates the times and widths of a device's availability window(s).

Advertisement/Advertisement Message—a broadcast/multicast frame periodically sent by an advertiser that contains information about services it has available.

Group Advertisement/Group Advertisement Message—a broadcast/multicast frame periodically sent by a group advertiser that contains information about its own services (if any), as well as services available on other devices on the network.

Advertisement Request/Advertisement Request Message—a message sent by a device to another device requesting that the recipient acts as a group advertiser and advertise services on behalf of the sender.

Advertisement Response/Advertisement Response Message—a message sent by a device to another device in response to an advertisement request message, indicating whether the sender will honor the initial request message and act as a group advertiser.

Service Request/Service Request Message—a message sent by a discoverer to an advertiser requesting detailed information about service(s) matching the supplied ID(s).

Service Response/Service Response Message—a message sent by an advertiser/group advertiser to a discoverer supplying detailed information about one or more services.

Advertisement Period—the interval of time between successive transmissions of an advertisement frame by an advertiser.

Discovery Period—the interval of time between successive discovery attempts by a discoverer.

FIG. 1 is a network configuration which may be implemented with an embodiment of the invention. Referring to FIG. 1, network configuration 100 includes multiple electronic devices 101-103 communicatively coupled to network 104, which may be a wireless network such as a IEEE 802.11 (e.g., WiFi) or a personal area network (PAN) compliant network (e.g., Bluetooth). Any one of devices 101-103 may be any of portable devices, such as, for example, a portable computing device (e.g. notebook/netbook computers such as MacBook™ from Apple Inc. of Cupertino, Calif.), a tablet PC (e.g., an iPad™ from Apple Inc.), a cellular/smart phone (e.g., iPhone™ from Apple Inc.), a media player (e.g., iPod™ from Apple Inc.), a PDA, a copier/printer/scanner/modem/facsimile device, or a combination thereof. Alternatively, any one of devices 101-103 may be a desktop computer or other non-portal devices having a wireless communications interface (e.g., a built-in or plugged-in transceiver or RF frontend) that is capable of wirelessly communicating with another device in a wireless network.

Each of devices 101-103 includes service advertisement logic (e.g., logic 105-107 respectively) and service discovery logic (e.g., logic 108-110 respectively), which may be implemented in hardware, firmware, software, or a combination thereof. Service advertisement logic is responsible for advertising one or more services of a local device in network 104 while service discovery logic is responsible for discovering one or more services available from one or more remote devices in network 104. Devices 101-103 may advertise and/or discover one or more services in network 104 using a variety of wireless communications protocols, such as, for example, WiFi or Bluetooth compliant protocols. Further detailed information concerning service discovery using a personal area network protocol can be found in a co-pending U.S. patent application Ser. No. 12/405,130, entitled "Service Discovery Functionality Utilizing Personal Area Network Protocols", filed Mar. 16, 2009, which is incorporated by reference in its entirety.

The purpose of an advertisement of a service from one device (also referred to as an advertiser) is to inform other devices in a network, or to enable other devices (also referred to as discoverers) in the network to discover that the particular service is potentially available from that particular device. Also note that throughout this application, embodiments of the present application will be described in a wireless networking environment; however, it will be appreciated that such embodiments can also be applied in a wired networking environment.

In one embodiment, when a first device, in this example device 101, advertises one or more services available in a wireless network, the service advertisement logic 105 of the device 101 broadcasts or multicasts an advertisement message (also simply referred to as an advertisement, or a service advertisement) in network 104, where the advertisement includes one or more service identifiers (IDs), each identifying a particular service potentially available from device 101. A service identifier may be represented by a hash value constructed using a variety of hash algorithms (e.g., SHA-1 or MD5). A hash value may be generated based on data representing a signature or certain characteristics of a particular service. The advertisement further includes availability information, such as the availability schedule of device 101, that device 101 will use to set its availability window, when it will listen in network 104 for any service inquires for the advertisement from other devices (e.g., devices 102-103). Thereafter, device 101 may turn off or reduce the power for a certain portion of device 101, such as, for example, at least the radio frequency (RF) portion (e.g., transceiver, antenna) of device 101 until a subsequent certain time period according to the availability information associated with device 101. Alternatively, device 101 may in turn perform other tasks without transmitting or listening in network 104.

When a second device, in this example device 102, in the network receives the advertisement broadcast from device 101, based on the service identifiers in the advertisement, device 102 can determine whether it is interested in acquiring further detailed information of the advertised service from device 101. If so, according to one embodiment, device 102 can transmit a service request to device 101 according to the availability schedule of device 101 (e.g., during one of device 101's availability windows when device 101 is listening), where the service request includes one or more service identifiers of one or more selected services. In response to the service request, device 101 can transmit more detailed information of the requested services (e.g., device 102). That is, a service ID may merely indicate a service potentially available from an advertiser. In order to confirm such a service, a discoverer has to acquire further detailed information from the advertiser through a service request and response protocol.

According to another embodiment, each of devices 101-103 in the network 104 is configured to monitor operating environment of the respective device, as well as network traffic in the network. Based on the monitoring result, a device may adjust its service advertisement period (also simply referred to as an advertisement period) and/or service discovery period (also simply referred to as a discovery period) dynamically. For example, if the battery of device 101 is running low, device 101 may reduce the transmitting and listening frequency of service advertisement and service discovery (e.g., increase the service advertisement and/or discovery periods). Another example, if it is determined that communications channel congestion is relatively high, for example, due to a large number of devices in the network, device 101 may also adjust the service advertisement and/or discovery periods accordingly (e.g., increasing the advertisement and/or discovery periods).

In one embodiment, a service advertisement period and/or service discovery period are calculated based on one or more multiples of a predetermined base value. However, a service discovery period may not be configured as a multiple of a service advertisement period, or vice versa. As a result, an advertiser and a discoverer can calculate their own service advertisement period and/or service discovery period independently; but an advertisement from a advertiser (e.g., device 101) will still capable of being captured by a discoverer (e.g., device 102) over a period of time. In addition, because of the fact that a service advertisement period is not a multiple of a service discovery period or vice versa, each of the devices in the network can adapt their own period prior to establishing any communication among them, based on its own perception of the network conditions set forth above.

According to a further embodiment, devices 101-103 may coordinate with each other to select one or more of devices to advertise the services on behalf of other devices. For example, device 101 may be selected as a group advertiser according to a variety of parameters (e.g., a battery condition, etc.), which are monitored by a monitoring logic of the device, for advertising services for device 102 and/or device 103. Device 101 may operate as a group advertiser that advertises its own services and services of devices 102-103 in the network. Device 101 may also operate as an advertiser for advertising its own services, as well as an advertisee having one or more services to be advertised by another device (e.g., devices 102-103). Device 101 may also operate as an advertisee only that relies on another device (e.g., devices 102-103) for advertising its services.

Note that throughout this application, the term of "service" can be a broad range of services including, but not limited to, printing services, local area network (LAN) access services, wide area network (WAN) access services, cellular telephone services, data storage services, and/or application services (e.g., media playback, games, collaborative document creation services, recording services, etc.)

Efficient Service Advertisement and/or Discovery Mechanisms

Figure 2:
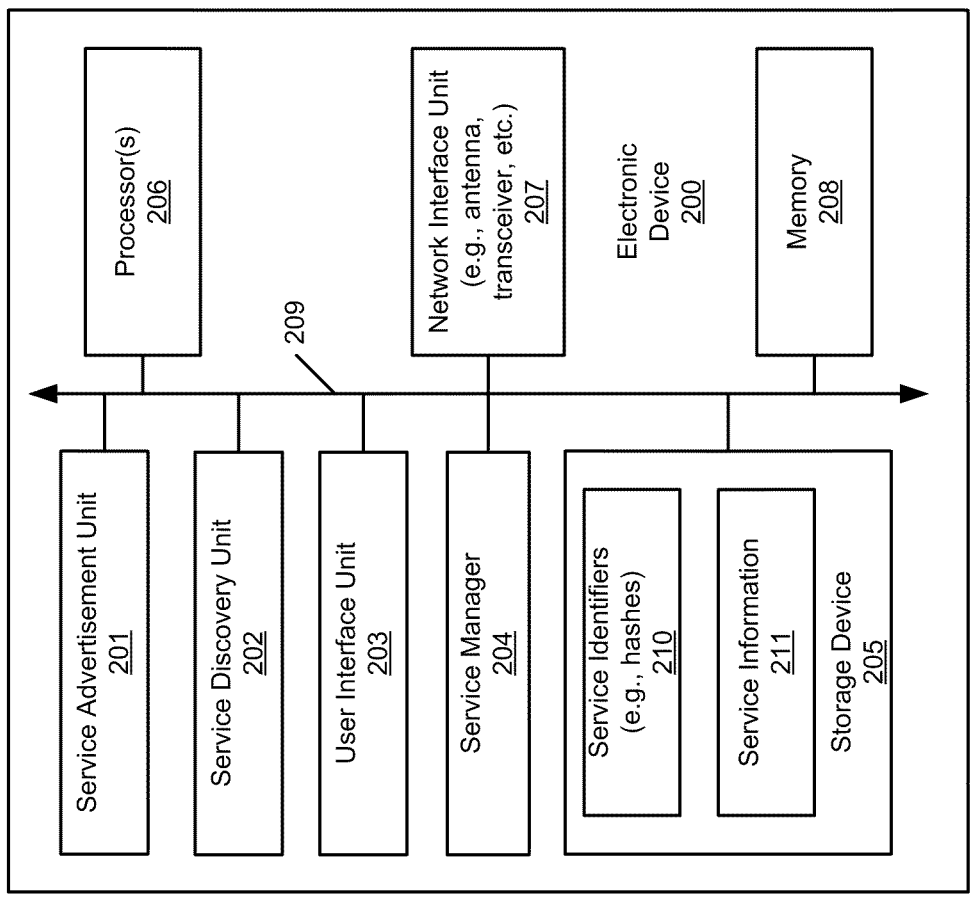
FIG. 2 is a block diagram illustrating an example of an electronic device according to one embodiment of the invention.

FIG. 2 is a block diagram illustrating an example of an electronic device according to one embodiment of the invention. For example, electronic device 200 may be implemented as a part of any one of devices 101-103 of FIG. 1. Referring to FIG. 2, device 200 includes, but not limited to, service advertisement unit 201, service discovery unit 202, user interface unit 203, service management unit 204, storage device 205, one or more processors or processor cores 206, network interface unit 207, and memory 208 coupled to each other via bus, interconnect, or mesh 209.

Processor 206 may be any kind of microprocessors, which may be a single processor, multiple processors, or multiple processor cores. Network interface unit 207 may be part of an RF frontend including, but is not limited to a wireless transceiver and an antenna or a modem, etc. Alternatively, network interface unit 207 may also include a wired communications interface, such as Ethernet port, a universal serial bus (USB) or Firewire™ port. Memory 208 may be any kind of random access memory (RAM), which is typically implemented as a volatile memory. User interface unit 203 may include a display device, an input device (e.g., keyboard, a touch pad, a touch screen, a stylus device, or a combination thereof), and an audio and/or video interfaces, etc.

Service advertisement unit 201 is responsible for advertising one or more services available or provided by device 200. For example, service advertisement unit 201 may be implemented as a part of any one of service advertisement logic 105-107 of FIG. 1. In one embodiment, service advertisement unit 201 is configured to advertise, via network interface unit 207, one or more services by broadcasting or multicasting an advertisement in the network (e.g., network 104 of FIG. 1) according to an advertisement schedule (e.g., advertisement period). An advertisement may include one or more service identifiers (IDs) identifying a service that is potentially provided by device 200. A service identifier may be generated by service manager 204 and stored in storage device 205 as a part of service identifiers 210. In one embodiment, a service identifier includes a hash value generated by service manager 204 according to a variety of hash algorithms, such as, for example, SHA-1 or MD5 algorithms.

Alternatively, a service identifier may be represented by a particular bit of a bitmask, where a bitmask includes one or more bits having a predetermined logical value, each representing a particular service. For example, the location of a particular bit of a bitmask is used to indicate a particular service that is potentially available from an advertiser, where the bitmask is broadcast in the network via an advertisement, similar to the techniques disclosed in co-pending U.S. patent application Ser. No. 12/687,814, entitled "Efficient Service Discovery for Peer-to-Peer Networking Device," filed Jan. 14, 2010, which is incorporated by reference herein in its entirety.

Again, a service ID may merely indicate a service potentially available from an advertiser. In addition, a hash (service ID) can possibly represent multiple services as there may be a collision where multiple services are hashed to the same value. In order to confirm such a service, a discoverer has to acquire further detailed information from the advertiser through a service request and response protocol. Advertising a potential service by broadcasting or multicasting a hash value representing such a potential service, and providing detailed information about the service only in response to a specific request for such a service, greatly reduces the network traffic involved in service advertisement and discovery.

The service manager 204 is also responsible for maintaining or managing service information 211 associated with services available from device 200, which may be stored in storage device 205. Storage device 205 may be implemented as any kind of memory devices or disks and accessed via any kind of file systems. Service manager 204 may also generate and maintain a list of services available in the network, including services advertised by device 200 and by other devices in the network. The list of services can be periodically updated in response to a result of a service discovery operation performed by service discovery unit 202.

Similarly, service discovery unit 202 is responsible for discovering one or more services available from the network, which may be advertised by one or more other devices in the network. For example, service discovery unit 202 may be implemented as a part of any one of service discovery logic 108-110 of FIG. 1. In response to an advertisement from a remote device, service discovery unit 202 is configured to communicate, via network interface unit 207, with the remote device to acquire further detailed information of the services and may generate or update a list of services that are available from the network, which may be stored as part of service information 211.

Figure 3:
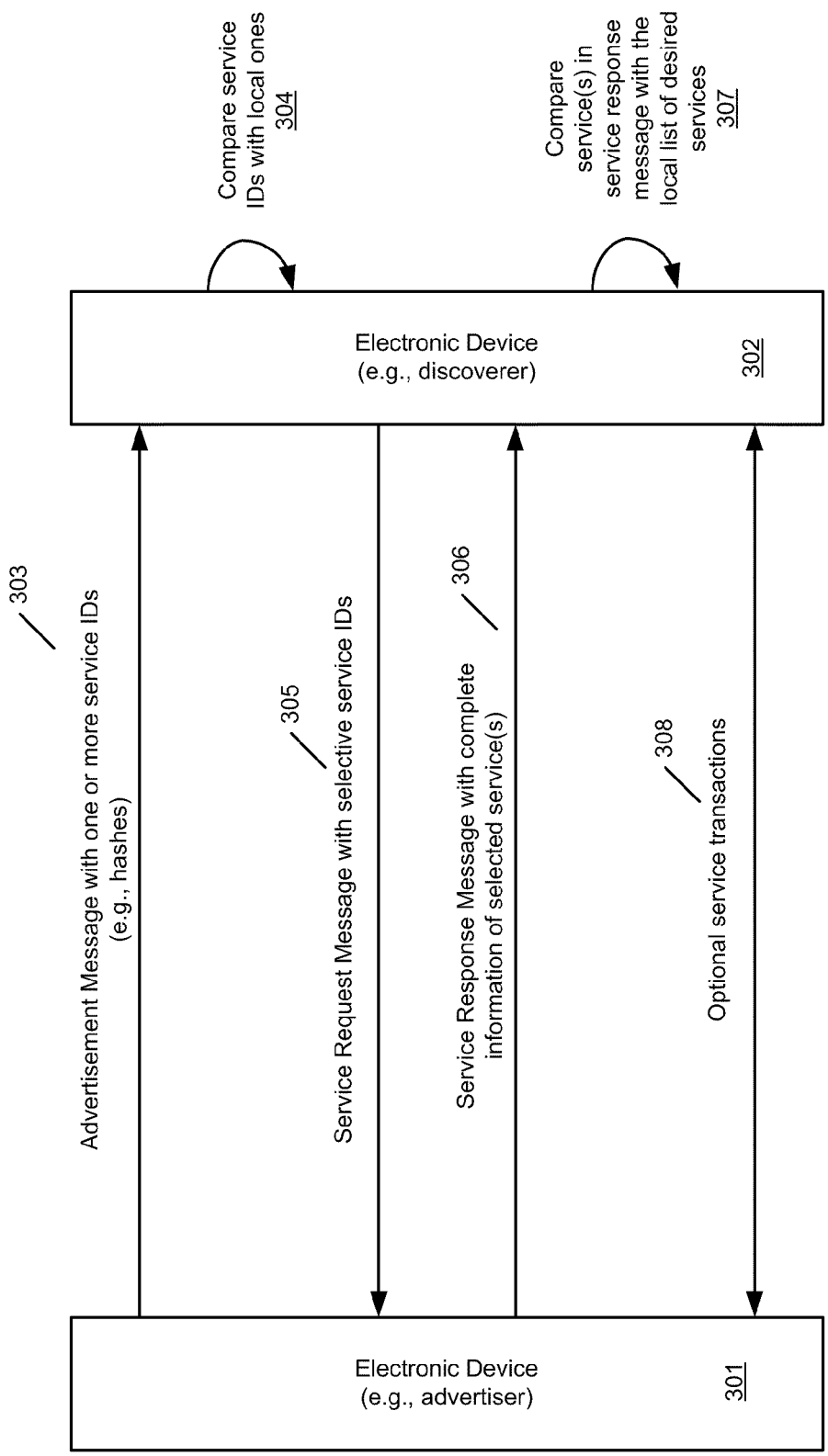
FIG. 3 is a flow diagram illustrating an example of a service advertisement transaction flow according to one embodiment.

FIG. 3 is a flow diagram illustrating an example of a service advertisement transaction flow according to one embodiment. For the purpose of illustration, it is assumed that both local device 301 (as an advertiser) and remote device 302 (as a discoverer) have similar or identical infrastructure as device 200 of FIG. 2. Referring to FIG. 2 and FIG. 3, according to one embodiment, after receiving an advertisement from a service advertisement unit of device 301 via transaction 303, a service discovery unit of device 302 compares the service IDs in the advertisement request with the ones locally generated via operation 304. If device 302 is interested in the advertised service or services, the service discovery unit of device 302 transmits a service request to device 301 via transaction 305, including one or more service identifiers identifying one or more services that device 302 is interested in. In response to the service request, the service advertisement unit of device 301 transmits a service response to device 302, including detailed information of one or more services requested via transaction 306. Note that a service identifier can merely indicate that a service is potentially available from device 301. In order to obtain detailed information of the potential service, the discoverer has to acquire detailed information by transmitting a service request based on the service identifier. Device 302 then compares the returned service information against the local list of desired services via transaction 307. If any of the services match devices 301-302 may participate in the services (e.g., playing games in a collaborated fashion) via transaction 308.

According to one embodiment, referring back to FIG. 2, when advertising a service, an advertisement generated by service advertisement unit 201 further includes an availability schedule of an advertiser, in this example, of device 200. In one embodiment, the availability schedule includes the start of the next availability window from the time of the advertisement was transmitted and the length of the window (e.g., duration of the availability window). That is, an advertiser may only listen in the network during a specific period of time. When a discoverer receives an advertisement, the discoverer may schedule a transmitting time slot according to the availability schedule of the advertiser, during which the discoverer transmits a service request to the advertiser during one of the advertisers' availability windows. Otherwise, either or both of the advertiser and discoverer can turn off or reduce power to at least a portion (e.g., wireless transceiver or RF frontend) of the respective device, for example, by a power management unit of the respective device (not shown). Note that some or all of the components as shown in FIG. 2 may be implemented in hardware, firmware, software, or a combination thereof.

Figure 4:
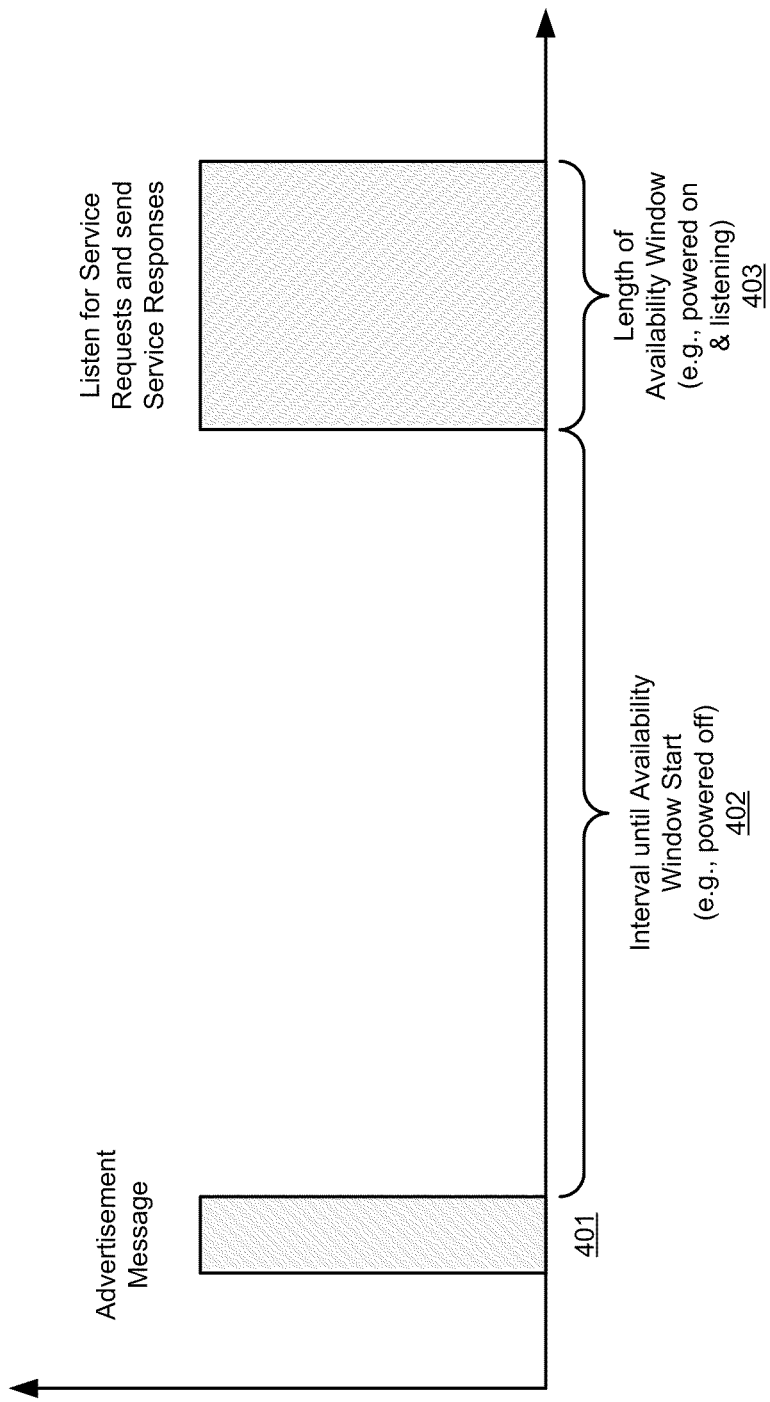
FIG. 4 is a timeline diagram of a service advertisement according to one embodiment.

FIG. 4 is a timeline diagram of a service advertisement according to one embodiment. Referring to FIG. 4, when an advertiser (e.g., device 200) advertises a service, in one embodiment, the advertiser may transmit an advertisement at time 401, where the advertisement includes an availability schedule having an interval until the next availability window start 402 and duration of the next availability window 403. That is, after transmitting the advertisement at time 401, the advertiser may turn off or reduce power to at least a portion of the device, such as, for example, an RF frontend of the device. The advertiser then may turn the power back on at the next availability window for duration 403, during which a discoverer may communicate with the advertiser to acquire further detailed information of a particular service or services. As a result, the power consumption of the advertiser may be reduced. During the availability window, the advertiser may receive a service request from a discoverer and replies with a service response having detailed information of the requested service or services.

Similarly, after a discoverer receives an advertisement, the discoverer may also turn off or reduce power to at least a portion of the device and wake up according to the next availability window of the advertiser for transmitting a service request to the advertiser. As a result, the power consumption of the discoverer may also be reduced.

Figure 5:
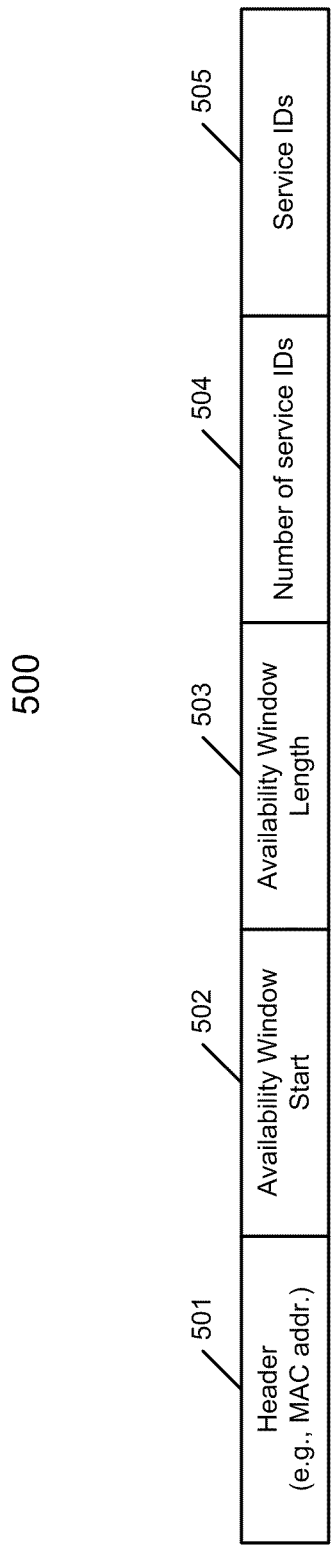
FIG. 5 is a block diagram illustrating an example of an advertisement message according to one embodiment.

FIG. 5 is a block diagram illustrating an example of an advertisement message according to one embodiment. Referring to FIG. 5, advertisement 500 includes, but not limited to, a header 501, Availability Window Start 502, Availability Window Length 503, number of service IDs 504, and one or more service IDs 505. In one embodiment, a service ID is represented by a hash value, which represents a possible service to be advertised. Generally speaking, a hash (service ID) can possibly represent multiple services as there may be a collision where multiple services are hashed to the same value. Note that the format and field arrangement of advertisement 500 is shown for illustration purpose only; other formats or fields arrangement may also be implemented.

Figure 6:
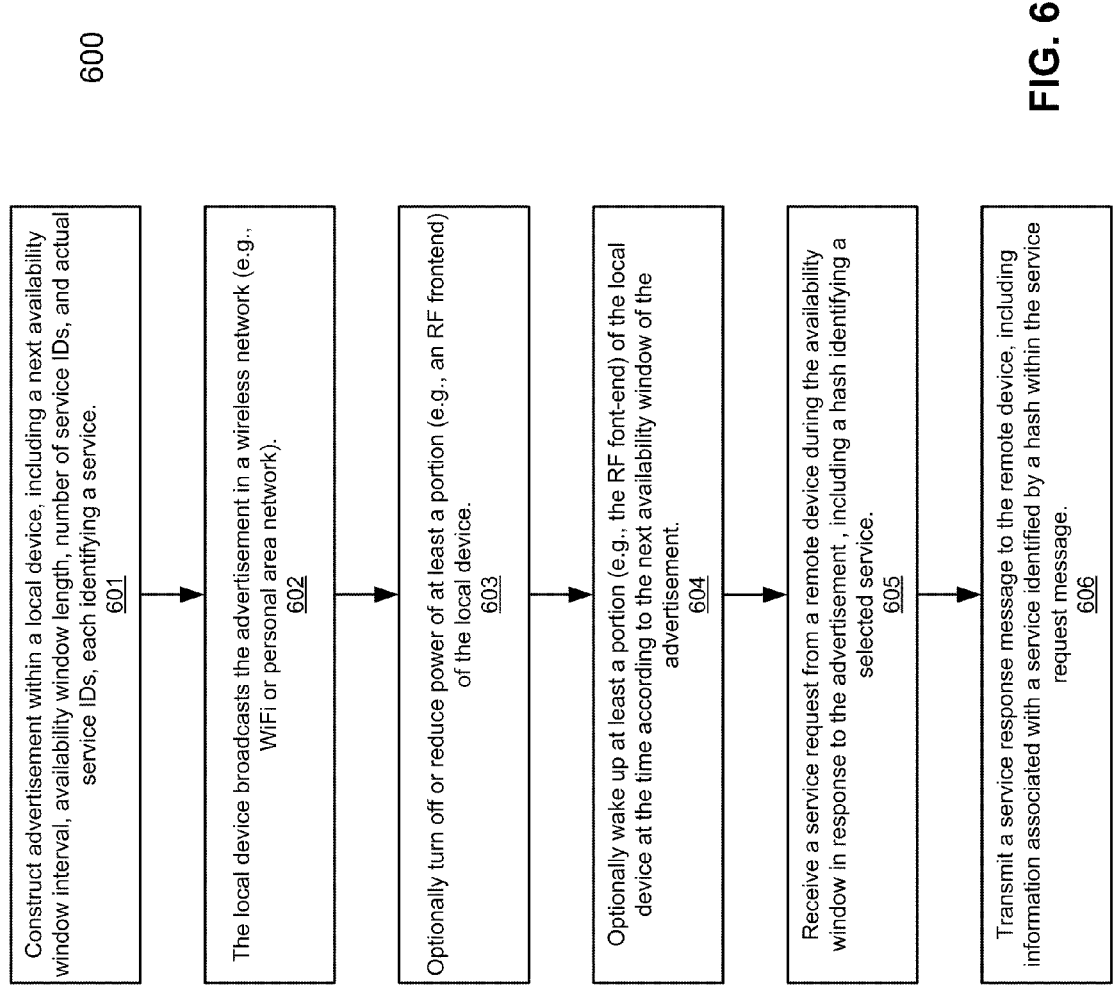
FIG. 6 is a flow diagram illustrating an example of a method for advertising a service according to one embodiment.

FIG. 6 is a flow diagram illustrating an example of a method for advertising a service according to one embodiment. Note that method 600 may be performed by processing logic which may include hardware, firmware, software, or a combination thereof. For example, method 600 may be performed by service advertisement unit 201 of FIG. 2. Referring to FIG. 6, at block 601, an advertisement is constructed within a local device (e.g., an advertiser), including a next availability window start period, availability window length, a number of service IDs (e.g., hashes), and the actual service IDs. Each service ID represents a service potentially offered by the local device. At block 602, the advertisement is broadcast or multicast by the local device in a wireless network.

At block 603, the local device may optionally turn off or reduce power to at least a portion of the device and wakes up at the time according to the next availability window specified in the advertisement request at block 604. At block 605, during the availability window, the local device listens and receives a service request from a remote device over the network in response to the advertisement. The service request includes one or more service IDs representing one or more services inquired by the remote device. The one or more service IDs may be selected from those presented in the advertisement previously broadcast or multicast from the local device. In response to the service request, at block 606, the local device transmits a service response to the remote device, including detailed information of the services requested in the service request.

Figure 7:
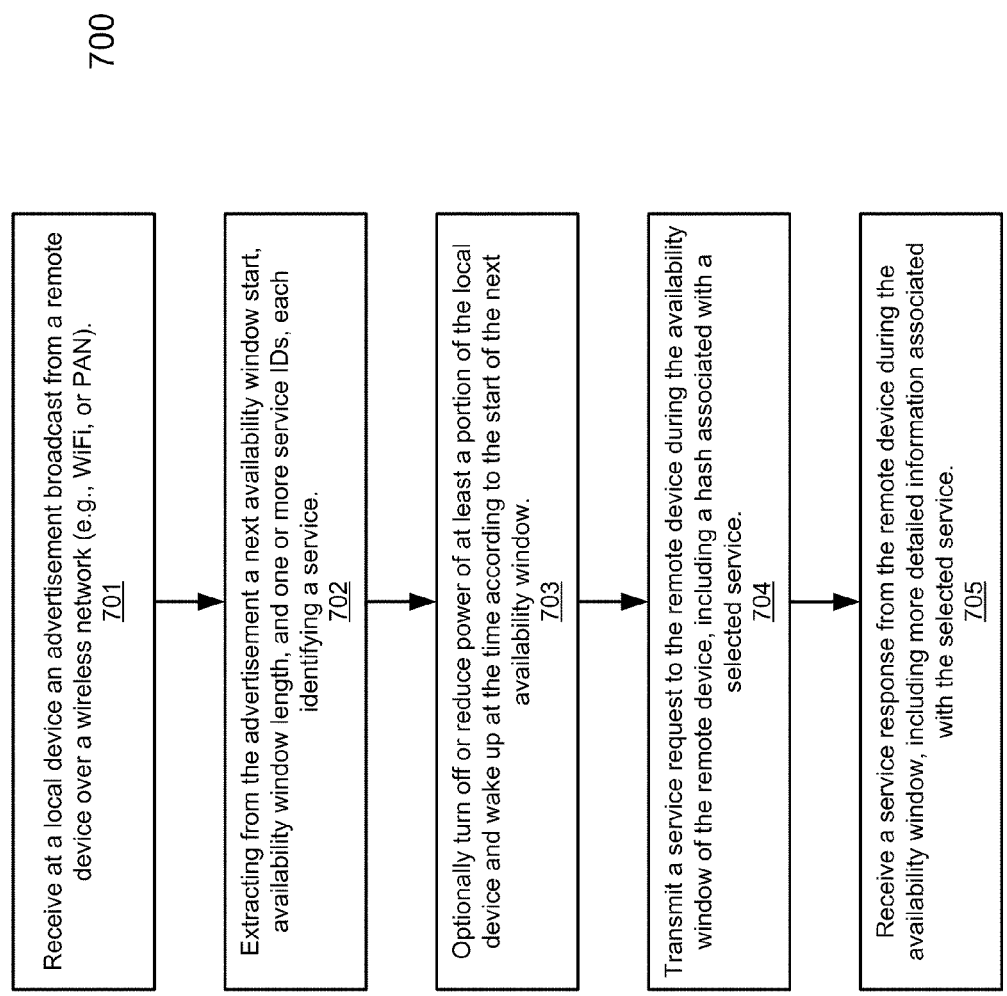
FIG. 7 is a flow diagram illustrating an example of a method for discovering a service according to one embodiment.

FIG. 7 is a flow diagram illustrating an example of a method for discovering a service according to one embodiment. Note that method 700 may be performed by processing logic which may include hardware, firmware, software, or a combination thereof. For example, method 700 may be performed by service discovery unit 202 of FIG. 2. Referring to FIG. 7, at block 701, a local device (e.g., a discoverer) receives an advertisement from a remote device over a network. In response to the advertisement, at block 702, the local device extracts from the advertisement a next availability window start, availability window length, and one or more service IDs (e.g., hashes) identifying one or more services advertised by the remote device. At block 703, the local device may optionally turn off or reduce power to at least a portion of the device and wake up at certain time according to the next availability window specified in the advertisement. At block 704, the local device transmits a service request to the remote device, where the service request includes one or more service IDs (e.g., hashes) identifying one or more services to be inquired. At block 705, a service response is received from the remote device during the availability window of the remote device, where the service response includes more detailed information of the inquired services.

Service Advertisement/Discovery with Dynamic Advertisement/Discovery Periods

According to some embodiments, the advertisement period and discovery period may be dynamically adjusted based on the operating conditions and/or user behaviors at the point in time. According to one embodiment, each device in the network is configured to monitor operating environment of the respective device, as well as network traffic in the network. Based on the result of the monitoring, a device may adjust its advertisement period and/or service discovery period dynamically. For example, if the battery of a device is running low, the device may reduce the frequency of the service advertisement and service discovery (e.g., increase the service advertisement and/or discovery periods). Another example, if it is determined that communications channel congestion is relatively high, for example, due to a large number of devices in the network, a device may also adjust the service advertisement and/or discovery periods accordingly (e.g., increasing the service advertisement and/or discovery periods to avoid congestion collapse of the network).

In one embodiment, a service advertisement period and/or service discovery period are calculated based on multiples of a predetermined base value. However, a service discovery period may not be multiples of a service advertisement period, or vice versa. As a result, an advertiser and a discoverer can calculate their own service advertisement period and/or service discovery period independently; however, an advertisement request of an advertiser is still capable of being captured by a discoverer over a period of time dependent upon the specific calculation of the service advertisement period and/or service discovery period.

Figure 8:
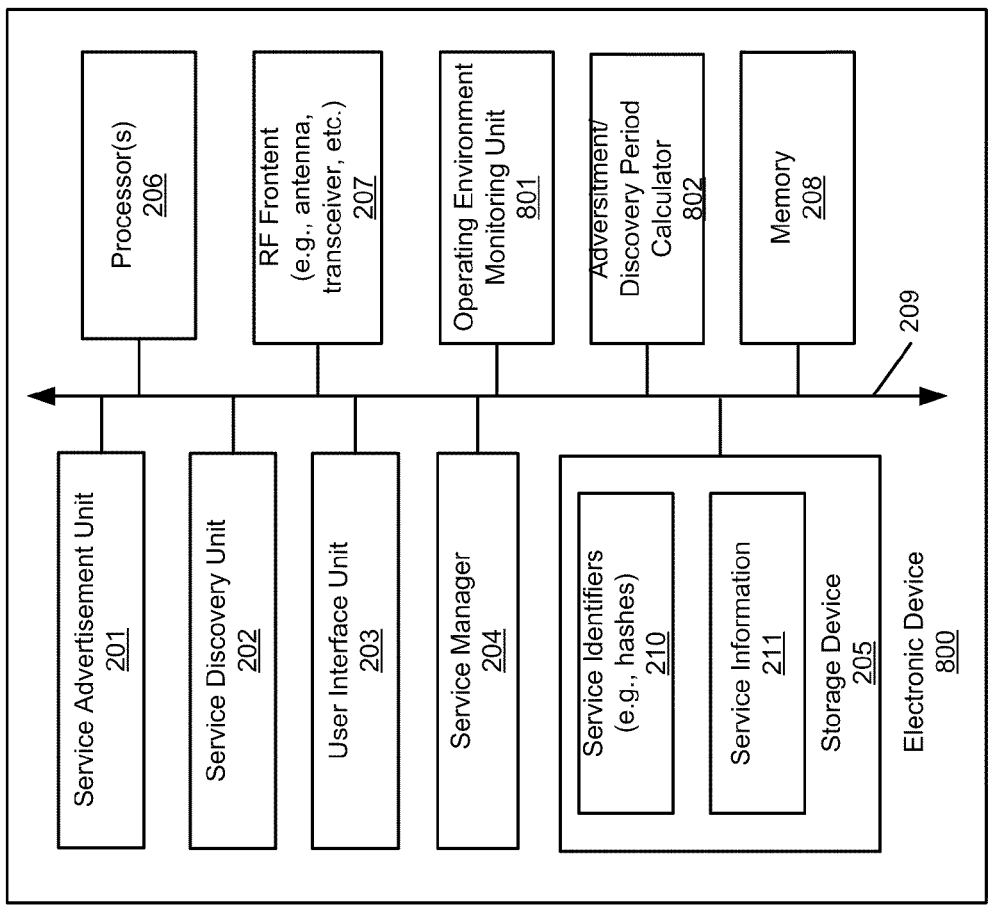
FIG. 8 is a block diagram illustrating an electronic device according to another embodiment of the invention.

FIG. 8 is a block diagram illustrating an electronic device according to another embodiment of the invention. For example, device 800 may be implemented as any one of devices 101-103 of FIG. 1. Referring to FIG. 8, similar to device 200 of FIG. 2, device 800 includes, but not limited to, a service advertisement unit 201, service discovery unit 202, a user interface unit 203, a service management unit 204, a storage device 205 for storing service identifiers 210 and service information 211, one or more processors or processor cores 206, a network interface unit 207, a memory 208, and a user interface unit 203 coupled to each other via a bus, interconnect, or mesh 209. These components have identical or similar functionalities as those shown in FIG. 2 and thus, certain reference numbers are retained from FIG. 2.

In addition, according to one embodiment, device 800 includes operating environment monitoring unit 801 and advertisement and/or discovery period or schedule calculator 802. In one embodiment, operating environment monitoring unit 801 is configured to monitor the operating environment of device 800, as well as network traffic in the network. Based on the result of the monitoring, advertisement/discovery period calculator 802 is configured to adjust the advertisement period and/or service discovery period dynamically. For example, if device 800 has a lesser battery life remaining (monitored by monitoring unit 801), advertisement and/or discovery period or schedule calculator 802 may reduce the frequency of the service advertisement and service discovery (e.g., increase the service advertisement and/or discovery periods). Another example, if it is determined that communications channel congestion is relatively high, for example, due to a large number of devices in the network or within a predetermined proximity, advertisement and/or discovery period calculator 802 may also adjust the service advertisement and/or discovery periods accordingly. Furthermore, the advertisement and/or discovery periods may also be adjusted based on the types of applications to be shared and user behaviors (e.g., active users), etc.

In one embodiment, a service advertisement period and/or service discovery period are calculated based on one or more multiples of a predetermined base value. However, a service discovery period may not be one or more multiples of a service advertisement period or vice versa. As a result, an advertiser and a discoverer can independently calculate and/or adjust the advertisement period and/or discovery period based on the local environment. In addition, because of the fact that a service advertisement period is not a multiple of a service discovery period, or vice versa, each of the devices in the network can adapt their own period without establishing any communication among them based on its own perception of the network conditions set forth above.

Figure 9:
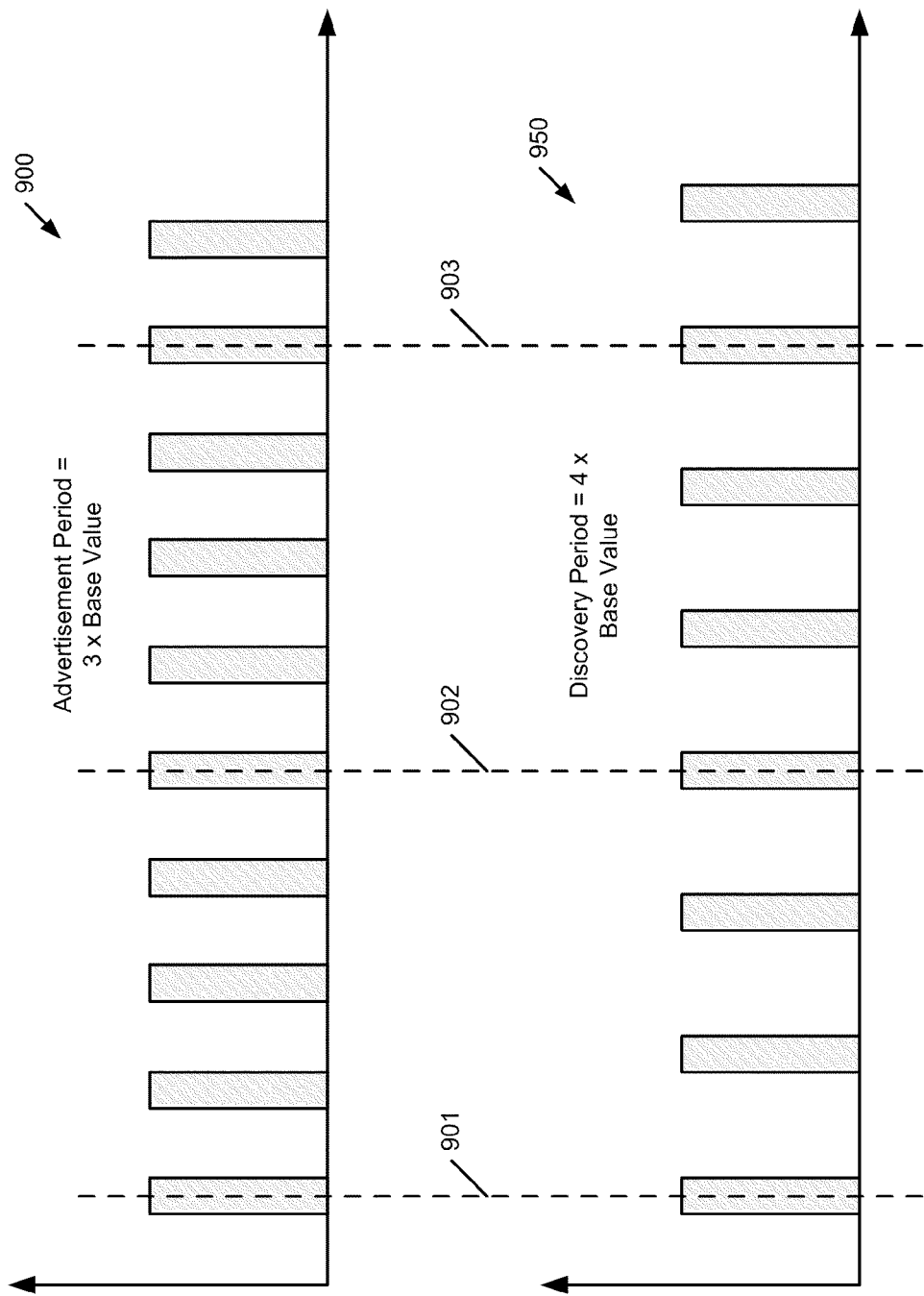
FIG. 9 is a timeline diagram illustrating an advertisement period and discovery period according to one embodiment.

FIG. 9 is a timeline diagram illustrating an advertisement period and discovery period according to one embodiment. Referring to FIG. 9, timeline 900 represents an advertisement period and timeline 950 represents a discovery period. For the purpose of illustration, the advertisement period is calculated based on 3 times of a predetermined base value while the discovery period is calculated based on 4 times of the predetermined base value. As shown in FIG. 9, although the advertisement messages are broadcast at a different time and a different rate than the discovery period, since both the advertisement period and discovery period are calculated based on a multiple of an agreed upon predetermined base value, the advertisement transmission and discovery listening eventually overlap at time slots 901-903.

As a result, an advertiser and/or a discoverer may independently adjust the adjustment factor based on the operating conditions of the individual devices. For example, if it is determined that the battery of a device is at a low level, the adjustment factor (N) may be increased to slow the advertisement and/or discovery activities, which in turn reduces further power consumption and channel usage. However, increasing an advertisement period and/or discovery period may also increase the detection time to catch a particular advertisement message, which leads to a lower performance.

According to another embodiment, a discovery period is calculated as a multiple of a dwell time (e.g., the period of time during which the device is listening for advertisement message), but not a multiple of an advertisement period. In a particular embodiment, an advertisement period is configured to be a multiple of a predetermined base value (e.g., 100 ms)*2^N, where N could be any integer number; a discovery period is configured to be the predetermined base value*3^M or 5^M, where M could be any integer number; and a dwell time is configured to be the predetermined base value (e.g., 100 ms)*(1+10%). Adding 10% to the dwell time account for inefficiency ensures that the dwell time is strictly greater than the predetermined base value.

In the table below, the percentage numbers in bracket represent the percentage of time at least the RF frontend of a device has to be up for these specific advertisement/discovery periods. The advertisement number is based on a 2 ms ballpark estimate for the advertisement message transmission: waking up the radio, contending for the channel and transmitting a few hundred us frame. The discovery number is based on a 100 ms discovery listen dwell time. The numbers in the main part of the table indicate how long it will take to discover a device in the worst case if the advertiser is using the advertisement period in the relevant column header and the discoverer is using the discovery period in the relevant row header. All times are in seconds.

|  | Adv. Period | | | |
| --- | --- | --- | --- | --- |
| Disc. Period | 0.1 (2%) | 0.2 (1%) | 0.4 (.5%) | 0.8 (.25%) |
| 0.1 (100%) | 0.1 | 0.2 | 0.4 | 0.8 |
| 0.3 (33.3%) | 0.3 | 0.6 | 1.2 | 2.4 |
| 0.9 (11.1%) | 0.9 | 1.8 | 3.6 | 7.2 |
| 2.5 (4%) | 2.5 | 5 | 10 | 20 |
| 2.7 (3.7%) | 2.7 | 5.4 | 10.4 | 20.8 |
| 8.1 (1.24%) | 8.1 | 16.2 | 32.4 | 64.8 |
| 12.5 (.8%) | 12.5 | 25 | 50 | 100 |
| 24.3 (.41%) | 24.3 | 48.6 | 97.2 | 194.4 |
| 62.5 (0.0016%) | 62.5 | 125 | 250 | 500 |

A device that is in a static environment or that wishes to drastically reduce the battery usage can independently increase its discovery period and advertisement period, for example, 24.3 seconds and 200 ms respectively. In this example, based on the table above, this ensures that the airtime (e.g. time during which the radio is listening and at full power) for such a device is below 1.5% at the cost of increased detection time (48.6 seconds in order to detect another device optionally implementing the same value). "Static environment" refers to, for example, the case of a user staying home for a long period of time, and hence will not encounter change in the wireless operating environment. Similarly, a device with a large battery or which is in a dynamic environment (or which detect that it is moving) can also independently decrease its discovery period, for example, to 2.5 seconds, which can lead to a fast discovery time. This would be the case of a plugged device with an AC power. Devices that detect they are in a crowded environment, for example, if they detect more than 15 other advertisers or access points (APs), can independently increase their advertisement periods, which increases the detection time but reduces network congestion. Increasing advertisement period, for example, to 400 ms, could cause detection time to be in the 50 second range for a device that is discovering with 12.5 second period, and the air time in this case is 1.3%. This would be the case in which a user may be sitting in a conference room or an open space work environment with many cubicles.

Detection of the fact that a user is moving can be done by recording the presence of a few access points with a reasonably high received signal strength indicator (RSSI) across multiple discovery periods. This requires a device to cache the basic service set identifiers (BSSIDs) of the certain highest RSSI APs that are detected during a discovery period. If there is no high RSSI AP detected, this means that the user is moving fast or is in a WiFi free environment. Advertisement period and discovery period should be adjusted lower in order to decrease detection time. If one or more of those high RSSI APs are constantly detected across several discovery periods (e.g., associated or not associated, and not roaming), then the user may be sitting at home or in a known place. The discovery period can be set to 200 ms and advertisement period can be increased to a large value (e.g., 24.3 seconds or 62.5 seconds). This user will not take a long time to detect other devices, but will be detected less easily by moving devices. If the environment is crowded, then adjustments have to be made in order to reduce potential congestion, and the advertisement period needs to be increased. As a result, devices can detect each other by discovering more often (e.g., consuming more power) or waiting longer.

Figure 10:
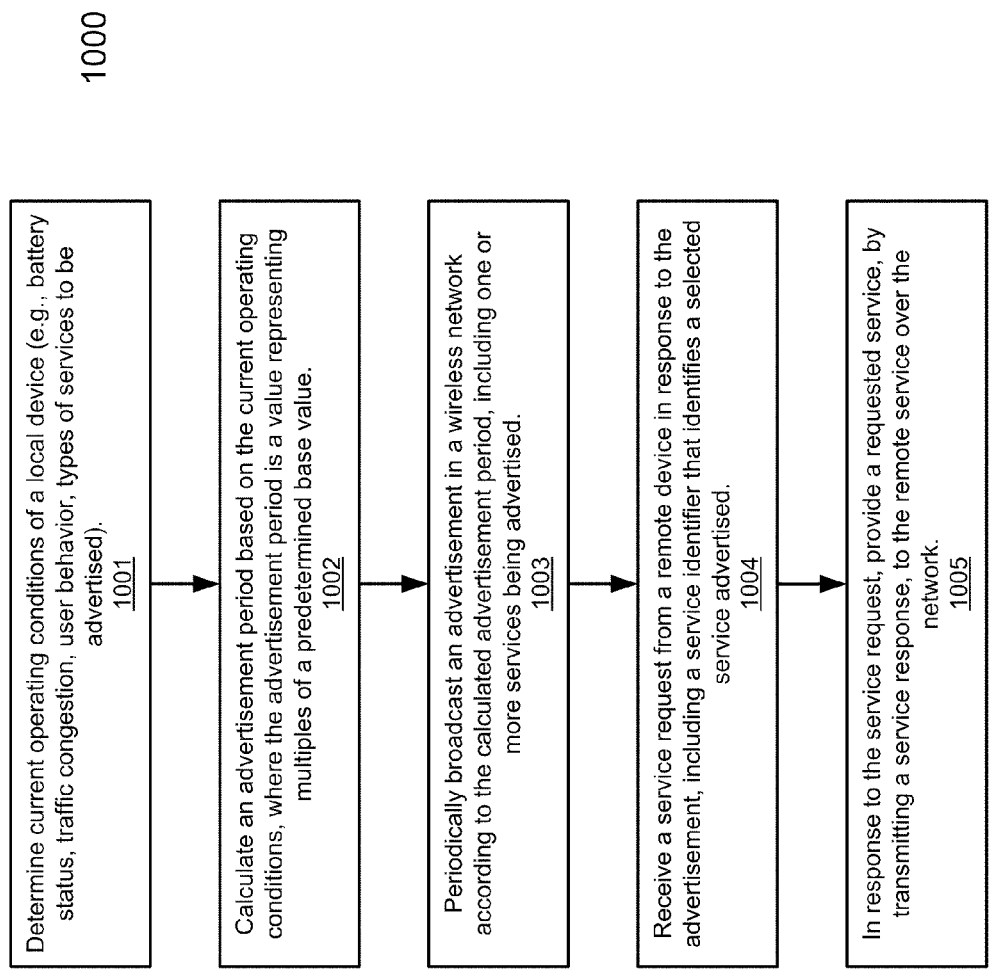
FIG. 10 is a flow diagram illustrating a method for advertising a service according to another embodiment of the invention.

FIG. 10 is a flow diagram illustrating a method for advertising a service according to another embodiment of the invention. Note that method 1000 may be performed by processing logic which may include hardware, firmware, software, or a combination thereof. For example, method 1000 may be performed by service advertisement unit 201 of FIG. 8. Referring to FIG. 10, at block 1001, current operating conditions are monitored by a local device (e.g., advertiser), including battery status, network traffic congestion, user behaviors, and types of services to be advertised, etc. Based on the operating conditions, at block 1002, an advertisement period is dynamically adjusted accordingly. In one embodiment, the advertisement period is a configured as a multiple of a predetermined base value as set forth above. At block 1003, an advertisement is broadcast or multicast in a network according to the adjusted advertisement period, including one or more services being advertised using the service advertisement and discovery techniques set forth above. At block 1004, a service request is received from a remote device in response to the advertisement request, including a service identifier or indicator that identifies a service to be inquired. In response to the service request, at block 1005, detailed information of the requested service is provided via a service response to the remote device over the network.

Figure 11:
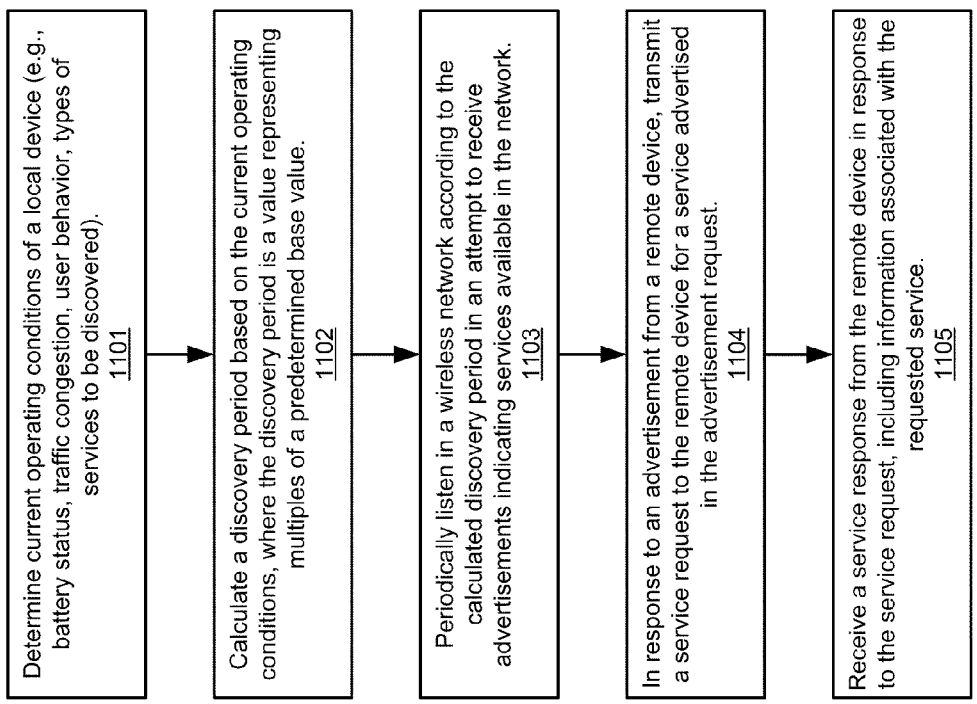
FIG. 11 is a flow diagram illustrating a method for discovering a service according to another embodiment of the invention.

FIG. 11 is a flow diagram illustrating a method for discovering a service according to another embodiment of the invention. Note that method 1100 may be performed by processing logic which may include hardware, firmware, software, or a combination thereof. For example, method 1100 may be performed by service discovery unit 202 of FIG. 8. Referring to FIG. 11, at block 1101, current operating conditions are monitored by a local device (e.g., discoverer), including battery status, network traffic congestion, user behaviors, and types of services to be advertised, etc. Based on the operating conditions, at block 1102, a discovery period is dynamically adjusted accordingly. In one embodiment, the discovery period is a configured as a multiple of a predetermined base value as set forth above. At block 1103, processing logic periodically listens in the network according to the adjusted discovery period in an attempt to discover a service available in the network. In response to an advertisement received from a remote device during the discovery, at block 1104, a service request is transmitted to the remote device for inquiring a service advertised in the advertisement. At block 1105, a service response is received from the remote device in response to the service request including certain detailed information of the requested service or services.

Coordinated Service Advertisements Embodiments

According to some embodiments, multiple devices that are capable of advertising one or more services may coordinate with each other to select one or more of devices to advertise the services on behalf of other devices. A device may be selected as a group advertiser according to a variety of parameters (e.g., a battery condition, etc.), which is monitored by monitoring logic of the device. A device may operate as a group advertiser that advertises its own services and services of other devices in the network. A device may also operate as an advertiser for advertising its own services, as well as an advertisee having one or more its services advertised by another device. A device may operate as an advertisee only that relies on another device for advertising its services.

Figure 12:
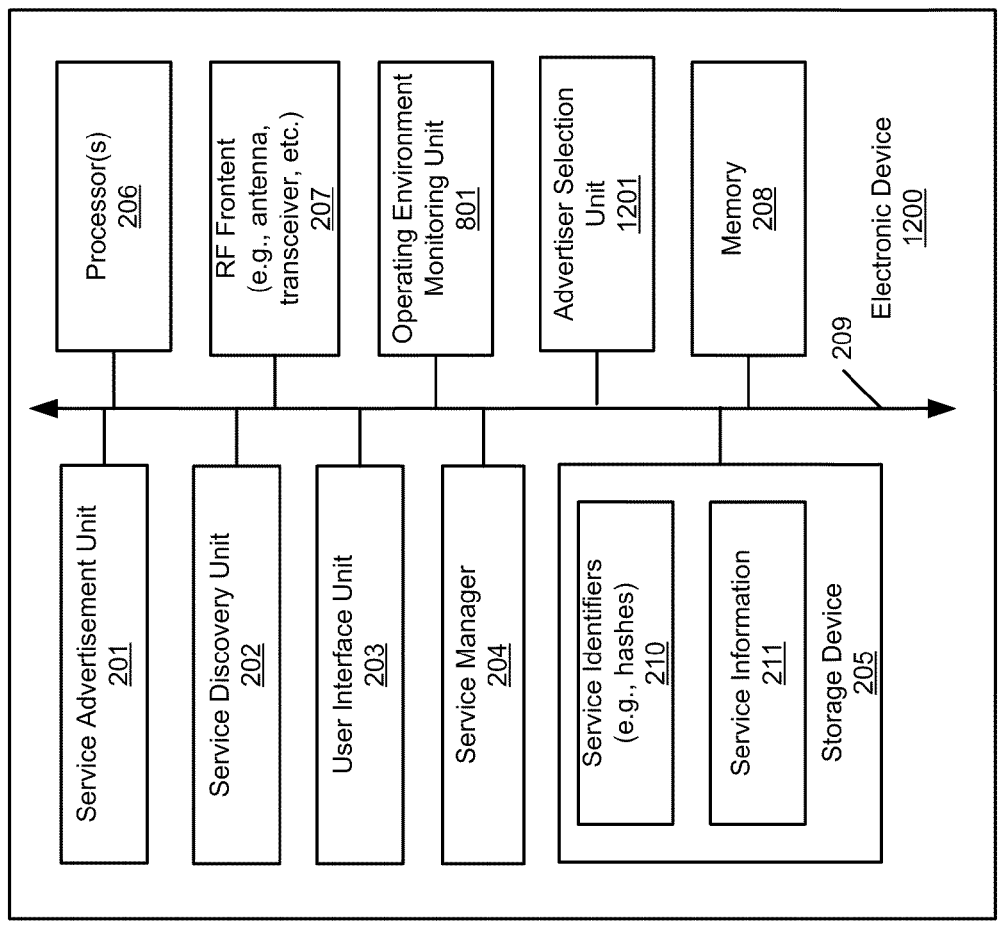
FIG. 12 is a block diagram illustrating an electronic device according to another embodiment of the invention.

FIG. 12 is a block diagram illustrating an electronic device according to another embodiment of the invention. For example, device 1200 may be implemented as any one of devices 101-103 of FIG. 1. Referring to FIG. 12, similar to device 200 of FIG. 2 or device 800 of FIG. 8, device 1200 includes, but not limited to, service advertisement unit 201, service discovery unit 202, user interface unit 203, service management unit 204, storage device 205 for storing service identifiers 210 and service information 211, one or more processors or processor cores 206, network interface unit 207, memory 208, user interface unit 203 coupled to each other via bus, interconnect, or mesh 209, and an operating environment monitoring unit 801. These components may have identical or similar functionalities as those shown in FIGS. 2 and 8 and thus, certain reference numbers are retained from FIGS. 2 and 8 for the purpose of illustration.

In addition, according to one embodiment, device 1200 further includes advertiser selection unit 1201 configured to coordinate with other devices within a proximity of the network to select one or more devices as group advertisers that advertise services on behalf of others. For example, advertiser selection unit 1201 communicates with advertiser selection units of other devices within a predetermined proximity of the network to select or negotiate one or more devices among them to be group advertisers. The one or more devices may be determined and selected based on one or more parameters or attributes, such as, for example, operating conditions and/or user behaviors, which may be monitored or collected by monitoring unit 801.

For example, when advertiser selection unit 1201 determines that a remote device should be selected as an group advertiser, advertiser selection unit 1201 may instruct service advertisement unit 201 to transmit a service advertisement request message (also simply referred to as an advertisement request) to the selected remote device, such that the remote device can advertise the services for device 1200. Unlike an advertisement which is broadcast or multicast in the network, an advertisement request may a unicast (e.g., point-to-point) message requesting a specific remote device for advertisement. Alternatively, an advertisement request may be multicast or broadcast in the network requesting one or more remote advertisers. In one embodiment, the service advertisement request sent to the remote advertiser includes an address of device 1200 (e.g., media access address or MAC of device 1200), a number of service identifiers, actual service identifiers (e.g., hashes), and availability information such as the availability schedule of device 1200. As a result, when the services are advertised by the remote group advertiser, a remote discoverer can directly communicate with device 1200 to inquire one or more services that are advertised by a remote group advertiser, without having to contact the remote group advertiser. Device 1200 may continue advertising its own services while a remote group advertiser advertises at least some of the services on behalf of device 1200.

Alternatively, once a remote advertiser is selected to advertise services for device 1200, advertisement selection unit 1201 may instruct service advertisement unit 201 to stop advertising its own services and to transition device 1200 into an advertisee. Furthermore, advertisement selection unit 1201 may simply receive a service advertisement request from a remote device and instruct the service advertisement unit 201 to carry out the advertisement on behalf of the remote device, as well as its own services. In this situation, an advertisement request is a unicast or multicast message (e.g., specifically directed to one or more specific devices), rather than a broadcast message (e.g., sent to all devices in the network).

Embodiments of the present application can be applied in a situation where many devices are in range of each other and participating in proximity detection (e.g., in a crowded conference room). In this situation, scalability is achieved by having devices sharing their advertisements in which only a few devices advertise for all others. When two devices see each other (via proximity detection set forth above) and regardless of the fact that they may share a common service identifier (e.g., hash), one of the devices may request the other to carry its own advertisement payload, for example, by transmitting a directed advertisement request frame to the other device. The advertisement request frame needs not be answered; as long as the requested device is observed to carry the advertisement payload of the requesting device, the requested device is considered to be a group advertiser for the requesting device, and the requesting devices then considered as an advertisee.

In one embodiment, a device may operate in one of four states:
State 0: advertiser (e.g., advertising only for itself).
State 1: group advertiser (e.g., advertise for itself and advertise for some other peers)
State 2: advertiser and advertisee (e.g., advertised by at least one other peer, advertising for itself, and not advertising for other peers)
State 3: advertisee (e.g., advertised by some other peers)

Devices start initially in state 0, in which they are advertising only their own services. This state is default state, and shares the same basic behavior as described in previous sections. Via participation in the cooperative advertising algorithm, devices in state 0 may be promoted to one of the additional cooperative advertising states 1-3.

The algorithm uses only one frame (i.e., the advertisement request), which is a directed frame and can be sent by a device in state 0, state 2 or state 3 to a device in state 0, state 1 or state 2. Whenever multiple devices are in a range of a high number of other devices participating in the proximity detection, they may enter cooperative advertisement. In one embodiment, each device implementing cooperative advertisement attempts to find a given number of advertisers that are capable of carrying its own advertisement payloads, such as, for example, two or three advertisers. When an advertisee is advertised by enough peers, it may stop transmitting its own advertisement frames and is then only discoverable through its remote group advertisers. A request for advertisement may be valid for a fixed period of time (e.g., several minutes) and may then be required to renew.

According to one embodiment, cooperative advertisement takes place only when two devices are able to see each others, i.e. they are both operating in state 0, state 1 or state 2. In one embodiment, a device may be elected as an group advertiser for another device based on at least some of the following considerations:

1. A device may be selected as a group advertiser if the device is not advertising for more than a predetermined number of peers (e.g., 16 peers);
2. A device may be selected as a group advertiser if the device is currently advertising for the highest number of other peers;
3. A device may be selected as a group advertiser if the device is currently advertised by the smallest number of peers;
4a. A device may be selected as a group advertiser if the device advertises the highest number of services in total; and/or
4b. A device may be selected as a group advertiser if the device has the longest battery life remained;
5. A device may be selected as a group advertiser if the device has the highest number of service IDs; and
6. A device may be selected as a group advertiser if the device has the highest MAC address.

In order to elect one device the above clauses are evaluated in a sequential order and/or in parallel. For example, clauses 4a and 4b may be evaluated concurrently. That is, a device that has an abnormally high number of service IDs would most likely be selected as a group advertiser. If the number of service IDs is about the same, then battery usage becomes a prime factor. If on the other hand, a devices has an infinite battery life (e.g., plugged into an AC outlet), then it would also likely be elected as a group advertiser. In one embodiment, battery usage may be coded with two numbers representing the class of device and the amount of up time remaining on the battery. Optimizing the topological distribution of the cooperative advertisements is one of the goals of the algorithm. This goal is to converge to a situation where a small number of group advertisers are carrying extra advertisement payloads for other advertisees, which will then stop advertising themselves (i.e. entering state 3). The advertisers of an advertisee may be spatially distributed around and/or close to the advertisee (e.g., uniform spatial distribution of advertisers).

The uniformity of spatial distribution is achieved because multiple group advertisers sharing a common advertisee should not be able to see each other or may see each other only with a very low RSSI, i.e. they are not close to each other. Whenever they are able to see each other with a certain level of RSSI (e.g., more than a half range RSSI) and they share a common advertisee, according to one embodiment, one of the group advertisers may drop the additional payload for that common advertisee and stop being an advertiser for that advertisee. In addition, amongst its surrounding peers matching clauses 1-6 above, a device is free to choose the closest one (e.g., based on RSSI) as its potential group advertiser.

According to some embodiments, advertisements are finite in time and need to be renewed periodically, for example, every few minutes or so. They are renewed when the corresponding advertisee transmits a new request to a group advertiser. Requests cannot be retransmitted to a given peer within a minimum amount of time, for example, within less than a few minutes. A device may ask (e.g., sending an advertisement request) to be advertised by another peer whenever the RSSI of frames it receives from the peer falls between a halfway and a maximum ranges, i.e. advertiser and advertisee are relatively close to each other. This helps avoid situations when third party devices are in range of the advertiser but not in range of the advertisee.

In one embodiment, a device may ask multiple peers to act as group advertisers, provided those peers meet clauses 1-6 above. Clauses 1-6 are designed so as within any pair of devices in range of each other, only one of the devices can potentially be elected as group advertiser for the pair. Group advertisers in state 3 in a half RSSI range of each other may compare their additional payloads and drop the redundant additional advertisement payloads. That is, if two group advertisers in a half RSSI range of each other share a common advertisee, then one of the advertisers should drop the advertisement for the advertisee. The election of a device dropping as an advertiser may also follow clauses 1-6 above. That is, a group advertiser that carries the highest number of peers (e.g., up to 16) will keep the common advertisee whereas the group advertiser that carries the lowest number of peers will drop the advertisee. Note that this does not require any frame exchanged. That is, the elected group advertiser will keep the shared advertisee and do nothing; the other one will silently drop the advertisee. Both advertisers stay in state 3.

In one embodiment, group advertisers in state 1 in a half RSSI range of each other that do not share a common advertisee may also choose to cooperate, i.e., one of the group advertisers is elected as a group advertiser and one is elected as advertisee for the pair. The advertisee enters state 2 (e.g., dropping its own advertisees) and if the advertisee reaches three peers, it will then drop its own payload and enters state 3 (e.g., it stops advertising altogether). The advertiser of the pair may start carrying the advertisee's advertisement payload, but not the advertisee's additional payload. This requirement ensures that an advertisee's additional payload is not transferred from a group advertiser originally located close to it to a group advertiser that might be located far from it. The third party peers that have been dropped now need to find a new advertiser or become advertisers themselves. Note that this also does not require any frame exchanged. Dropped peers in state 2 may find another group advertiser and remain in their current state, or they may transition to state 0 and operate without a group advertiser. A device in state 3 that finds itself in a situation where it cannot find at least 2 group advertisers carrying its advertisement payload may enter state 2 and resume broadcasting its own advertisements. A device in state 3 that can't find any group advertisers carrying its advertisement payload may enter state 0 and resume broadcasting its own advertisements. These two transitions can occur when a group advertiser goes out of range, is disabled, and/or when the advertisement request times out, and all group advertisers around it are at maximum capacity and/or when there are not many advertisers surrounding it. Alternatively, a device in state 3 may that cannot find sufficient group advertisers carrying its advertisement payload may select new group advertisers using the rules above, and if successful may remain in state 3.

For example, a "good" situation is when one group advertiser carries up to 16 additional payloads and an advertisee's payload is carried by 2 surrounding group advertisers. The number of advertisement frames transmitted on the channel is then globally divided by 16; hence there will be a much smaller probability of collisions. The total transmitted payload (i.e. byte per second) is divided by 8.

Figure 13A:
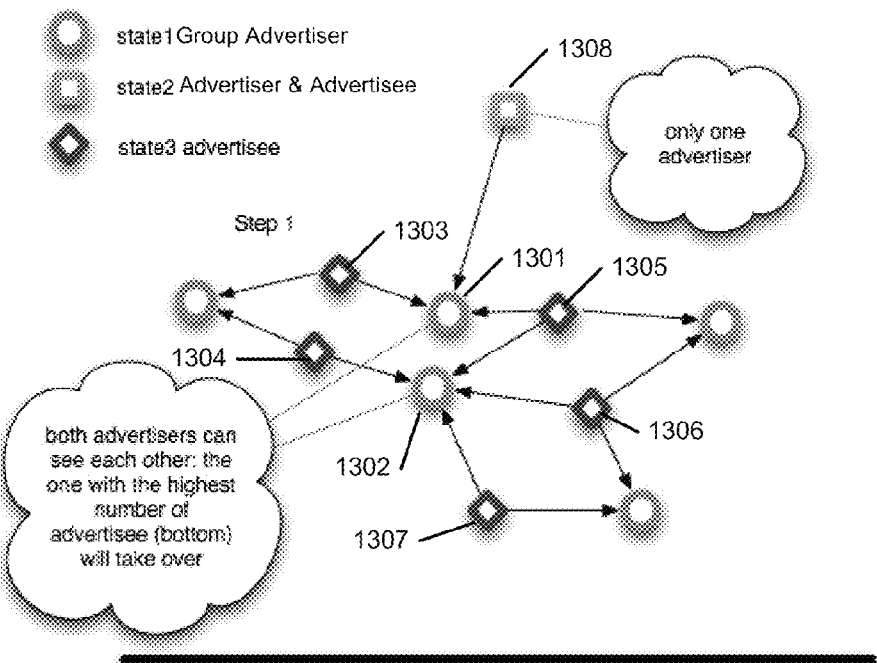
FIGS. 13A-13C are transitional diagrams illustrating examples of transitions of devices among advertising operating states according to some embodiments of the invention.
Figure 13B:
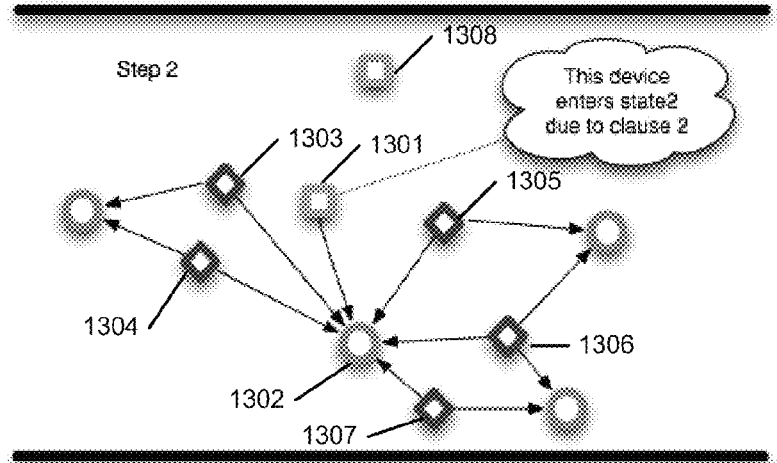
Figure 13C:
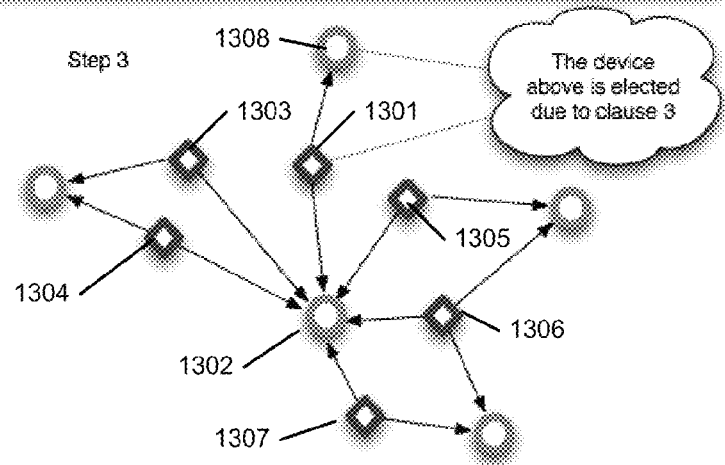

FIGS. 13A-13C are transitional diagrams illustrating examples of transitions of devices among operating states according to some embodiments of the invention. Referring to FIG. 13A, it is assumed that devices 1301-1308 are operating within a predetermined proximity, which is detected using certain techniques described above. In this example, devices 1301-1302 are operating as group advertisers in state 1; devices 1303-1307 are operating as advertisees in state 3; and device 1308 is operating as an advertiser & advertisee in state 2. As can be seen in FIG. 13A, device 1301 is selected as a group advertiser for device 1308, as well as devices 1303 and 1305. Device 1302 is selected as a group advertiser for devices 1304 and 1305-1307. It is also assumed that devices 1301-1302, which are operating in state 1, are close to each other and are able to see each other (e.g., above certain RSSI level).

Based on the above advertiser election algorithm, since device 1302 has a higher number of advertisees (e.g., devices 1304 and 1305-1307) than device 1301 (e.g., devices 1303, 1305, and 1308), between devices 1301-1302, device 1302 is selected as a group advertiser for device 1301. As a result, as shown in FIG. 13B, device 1301 transitions from state 1 to state 2, and it no longer operates as an advertiser for device 1308. Subsequently, in FIG. 13C device 1308 becomes a group advertiser in state 1 and device 1301 becomes an advertisee advertised by devices 1302 and 1308 due to clause 3 above (e.g., the smallest number of advertisees).

Figure 14:
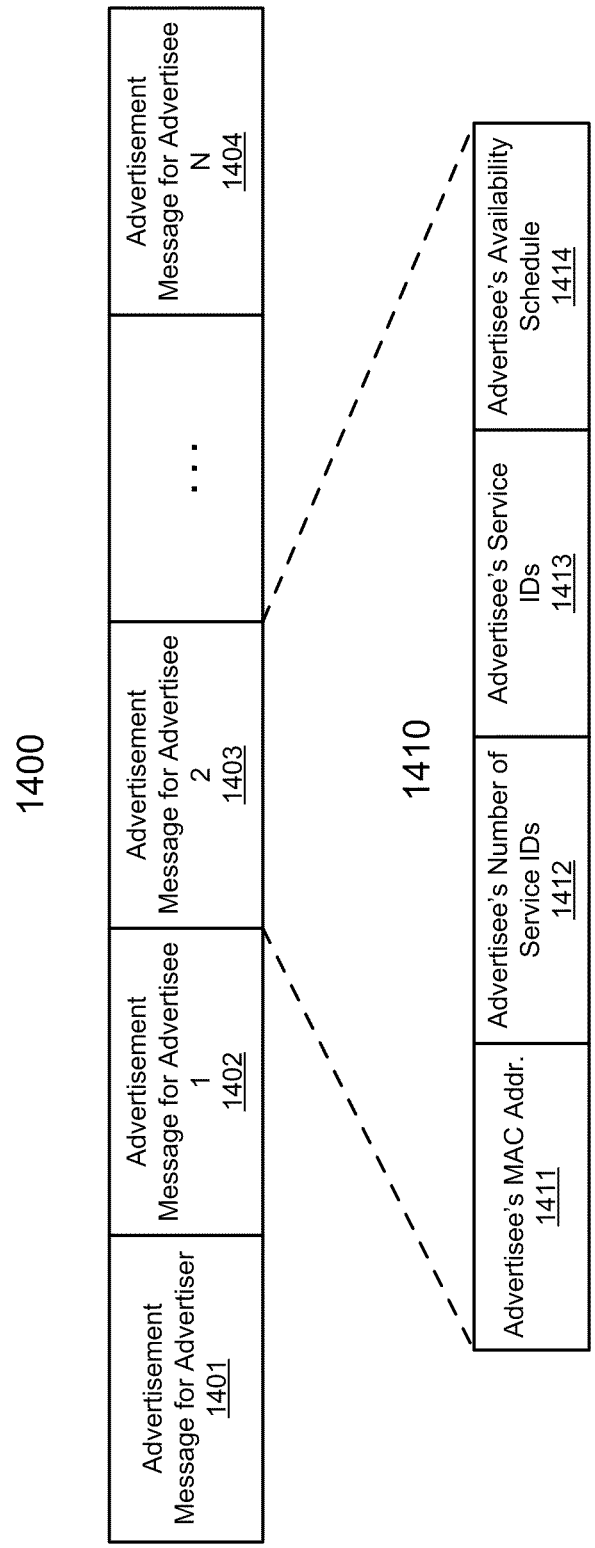
FIG. 14 is a block diagram illustrating a group advertisement message according to one embodiment of the invention.

When an advertiser carries an advertisement for an advertisee, a group advertisement message is created that includes an advertisement for its own services and the services of the advertisee. FIG. 14 is a block diagram illustrating a group advertisement message according to one embodiment of the invention. Referring to FIG. 14, group advertisement message 1400 includes advertisement message 1401 for the advertiser itself (e.g., advertisement message for its own services), which is identical or similar to advertisement message 500 of FIG. 5. In addition, compound advertisement message 1400 includes additional advertisement messages 1402-1404, each corresponding to an advertisee. In one embodiment, advertisement message 1410 for an advertisee (e.g., messages 1402-1404) includes address (e.g., MAC address) of the advertisee 1411, number of service identifiers 1412 and actual service identifiers (e.g., hashes) 1413, and the availability schedule 1414 of the advertisee. As a result, although advertisement message 1410 is advertised by an advertiser, other devices may respond to the advertisement by directly communicating with the advertiser. Note that the formats of advertisement messages as shown in FIG. 14 are described for illustration purposes only; other formats may also be applied.

Also note that although a local device may select a remote device to be its group advertiser based on the operating condition of the local device in view of the operating condition of the remote device, according to one embodiment, the remote device may reject or ignore the advertisement request based on its own determination or assessment of the operating condition of the remote device. In this situation, unless an acknowledgement is received from the remote device, the local device may have to monitor traffic (e.g., service advertisements) in the network to determine whether the selected remote device actually carries out the advertisement on behalf of the local device. The local device may have to select another remote device if the remote device rejects or ignores the advertisement request.

Figure 15:
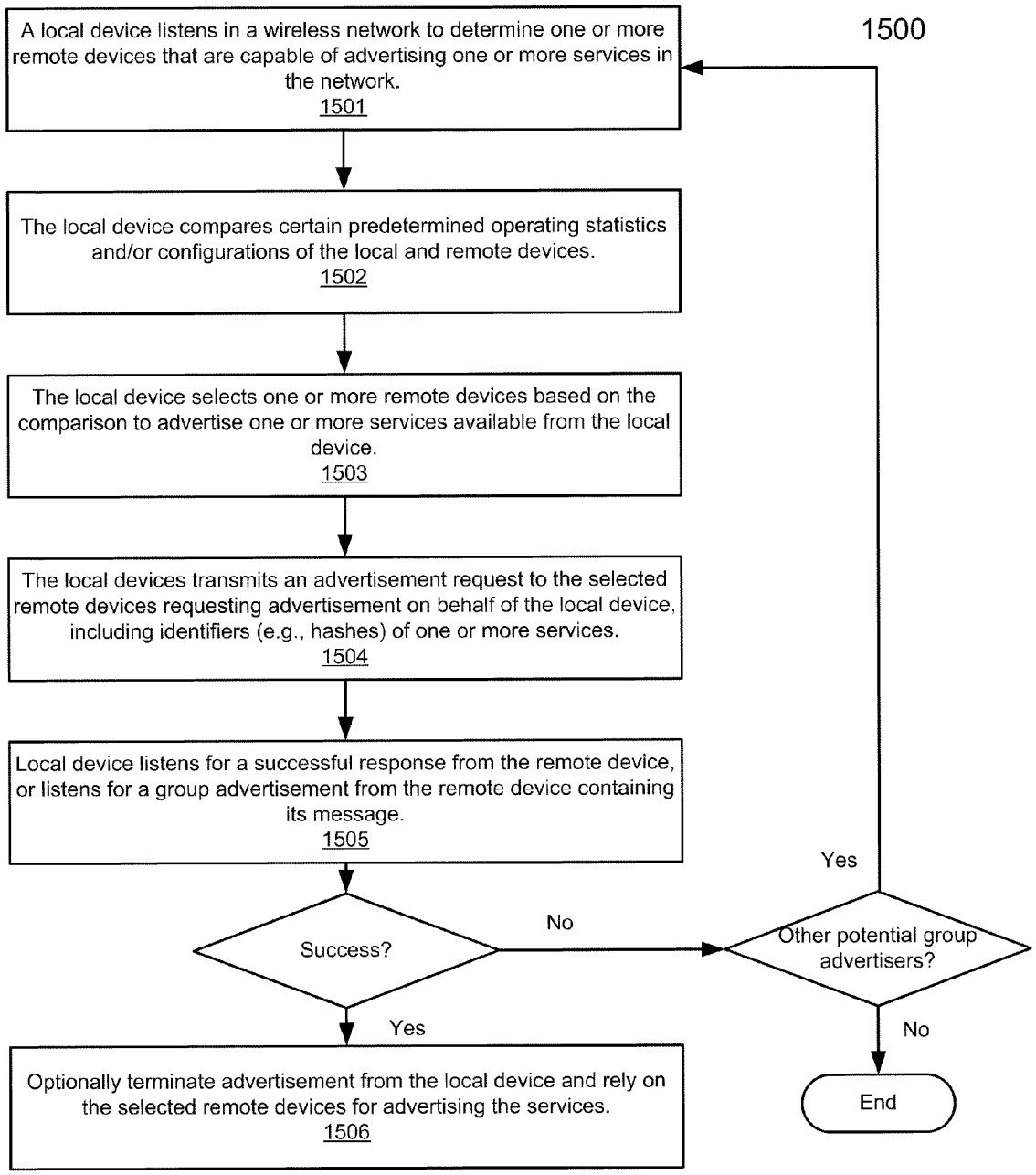
FIG. 15 is a flow diagram illustrating a method for a device to request that another device act as a group advertiser and advertise services on its behalf.

FIG. 15 is a flow diagram illustrating a method for advertising a service according to another embodiment of the invention. Note that method 1500 may be performed by processing logic which may include hardware, firmware, software, or a combination thereof. For example, method 1500 may be performed by advertisement unit 201 and/or advertiser selection unit 1201 of FIG. 12. Referring to FIG. 15, at block 1501, a local device listens in a wireless network to determine one or more remote devices that are capable of advertising one or more services in the network. At block 1502, the local device compares certain predetermined operating statistics and/or configurations of the local and remote devices. At block 1503, the local device selects one or more remote devices based on the comparison to advertise one or more services of the local device. At block 1504, the local device transmits an advertisement request to the selected remote devices requesting advertisement on behalf of the local device, including identifiers (e.g., hashes) of one or more services to be advertised. The device then waits to see whether the request was accepted by listening for its services in the remote device's next group advertisement message, or by waiting for a successful advertisement response at block 1505. If the request fails, the local device checks whether there are other remote devices that could serve as a group advertiser. If so, it goes to block 1501 and retries the procedure with a different device. If not, it stops the procedure. If the request succeeds, it continues to block 1505. At block 1505, optionally the local device terminates advertisement of its own services and relies on the selected remote devices for advertising its services.

Figure 16:
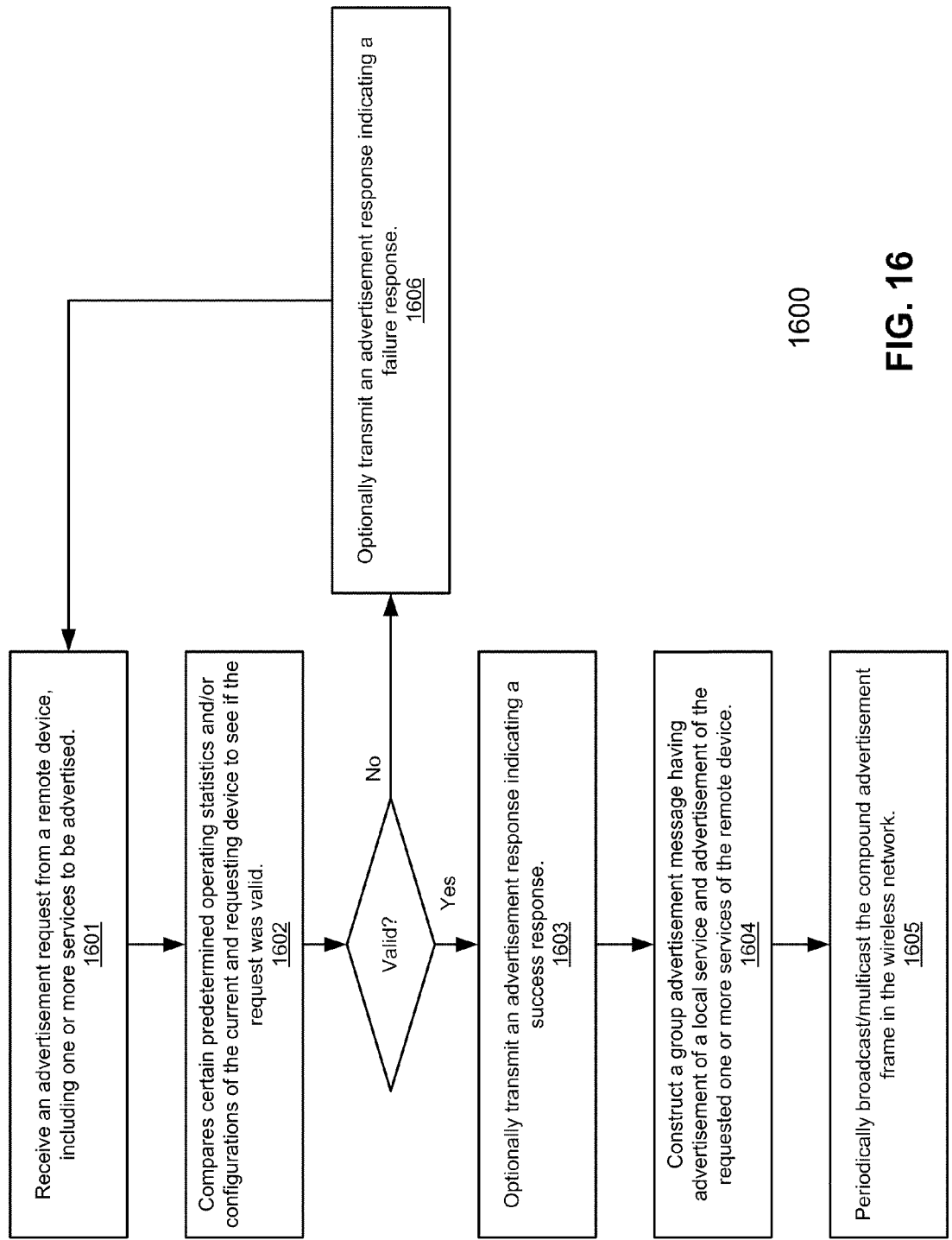
FIG. 16 is a flow diagram illustrating a method for a device to become a group advertiser and start advertising services on behalf of another device.

FIG. 16 is a flow diagram illustrating a method for advertising a service according to another embodiment of the invention. Note that method 1600 may be performed by processing logic which may include hardware, firmware, software, or a combination thereof. For example, method 1600 may be performed by advertisement unit 201 and/or advertiser selection unit 1201 of FIG. 12. Referring to FIG. 16, at block 1601, an advertisement request is received from a remote device, including service IDs for one or more services to be advertised. At block 1602, the device compares certain predetermined operating statistics and/or configurations of the current and requesting device to see if the request was valid. If not, it may transmit an advertisement response indicating failure at block 1606 and then goes to block 1602. If so, it may transmit an advertisement response indicating success and then continues to block 1604. At block 1604, processing logic constructs a group advertisement message having advertisement of a local service and advertisement of the requested one or more services of the remote device. At block 1605, the local device periodically broadcasts the compound advertisement frame in the network.

Figure 17:
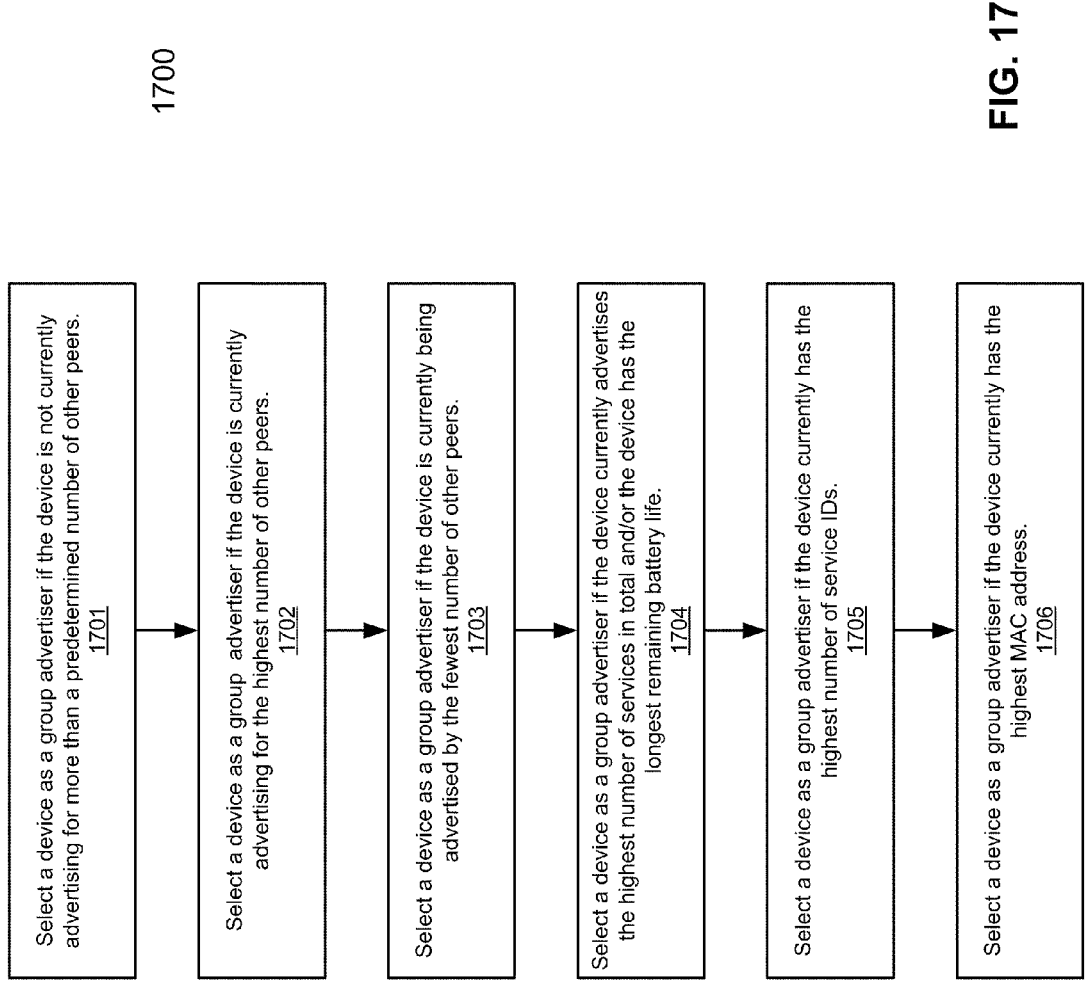
FIG. 17 is a flow diagram illustrating a method for selecting a group advertiser according to one embodiment of the invention.

FIG. 17 is a flow diagram illustrating a method for selecting a device as a group advertiser according to one embodiment of the invention. Referring to FIG. 17, at block 1701, a device may be selected as a group advertiser if the device is not currently advertising for more than a predetermined number of other peers. At block 1702, a device may be selected as a group advertiser if the device is currently advertising for the highest number of other peers. At block 1703, a device may be selected as a group advertiser if the device is currently being advertised (e.g., as an advertisee) by the fewest number of other peers. At block 1704, a device may be selected as a group advertiser if the device currently advertises the highest number of services in total or alternatively, if the device has the longest remaining battery life. At block 1705, a device may be selected as a group advertiser if the device currently has the highest number of services IDs. At block 1706, a device may be selected as a group advertiser if the device currently has the highest MAC (media access control) address. Note that operations involved in blocks 1701-1706 may be performed in sequence and/or in parallel, with no particular order. Other factors may also be considered herein.

Techniques described throughout this application can be applied to various scenarios or situations. Services can be advertised and/or discovered based on proximity detection of the portable devices using some of the techniques described above. This feature allows users of portable devices to advertise one or more services permanently through a wireless network protocol and to detect whether the portable devices move within a range of another portable device that is advertising one of those services. The term of "permanently" is referred to the fact that the advertisement can be open or available for a period of time without further interaction from the local user of the device (e.g., the advertiser).

For example, a gamer (e.g., chess or poker player, etc.) can easily connect to whatever internet site or gaming social network and play against any available opponent. Such a user may never meet the opponent in person, but knows (discovers) through the network. In this scenario, a user of a portable device looking for opponents would broadcast an advertisement for a specific game in the network. The advertisement may be generated by a gaming application and can include additional information such as ranking of the user as a player, desired ranking of an opponent, desired type of game, etc. As soon as users walk into a range of another person who is advertising the same game, both users may be alerted (e.g., by an alarm, vibration, etc.) and can connect with each other for playing. Proximity also means that users play with other users they will actually be able to meet in person vs. playing against random opponents across the network.

The techniques described above can also be applied in sharing content or files permanently (e.g., available for a period of time). This is similar to exporting certain content (e.g., pictures) from a portable device, but it is done in an ad-hoc fashion over a peer-to-peer link. For example, a user participating in a conference (or a party or present in a university campus) can share a picture or a document, and can keep this sharing "open" for a period of time (e.g., a day or the entire duration of the conference or party). Any colleague or friend that can be authenticated/paired with the user's device can walk by (e.g., within the proximity) and access (e.g., download) the picture or document.

If the owner of the shared content allows it, and dependent upon certain configuration of the corresponding device (e.g., advertiser), the content can be shared without requiring the owner's interaction (e.g., alerting or asking a permission, etc.) to create a peer-to-peer connection. For the user point of view, this means that one can snap a picture of an event and walk by all day continuously broadcasting the picture.

When two or more devices are coupled to each other via a network and within a predetermined proximity, devices can discover each other over the network as well as the services available to each other. If devices can determine that they support a common multi-device capable application (e.g., by a matching the corresponding service ID), such as a multi-player game, each of the devices may be configured to perform one or more distributed functionalities of the multi-device capable application. A distributed functionality is a functionality of the multi-device capable application that is assigned to one or more different devices, which may be perform the distributed functionality substantially simultaneously. The distributed functionalities may include input, output, and computing, etc. Each device may collaborate with other devices to perform its distributed functionalities. Moreover, some of the devices may collaborate with each other to perform the same distributed functionalities. In other words, each device may take up a specific role in performing the multi-device capable application, and has a relationship with other devices based on its role. Furthermore, such roles and relationships may be dynamically modified in response to addition of a device to the network, removal of devices from the network, current status of the execution of the application, and/or user inputs, etc.

In this example, at least part of a multi-device capable application is shared among multiple devices over a network. To share the multi-device capable application, all or part of the multi-device capable application may be previously installed on some or all devices in the network, where the multi-device capable application may be identified by a service ID set forth above. Alternatively, one or more devices may transmit all or part of the multi-device capable application to the other devices in the network in order to share the multi-device capable application. As a result, the distributed functionalities are performed in a collaborated fashion. Further detailed information concerning techniques for collaborated distributed functionalities by multiple devices can be found in co-pending U.S. patent application Ser. No. 12/479,586, entitled "Multifunctional Devices as Virtual Accessories," filed Jun. 5, 2009, which is incorporated by reference herein in its entirety.

Example of Data Processing System

Figure 18:
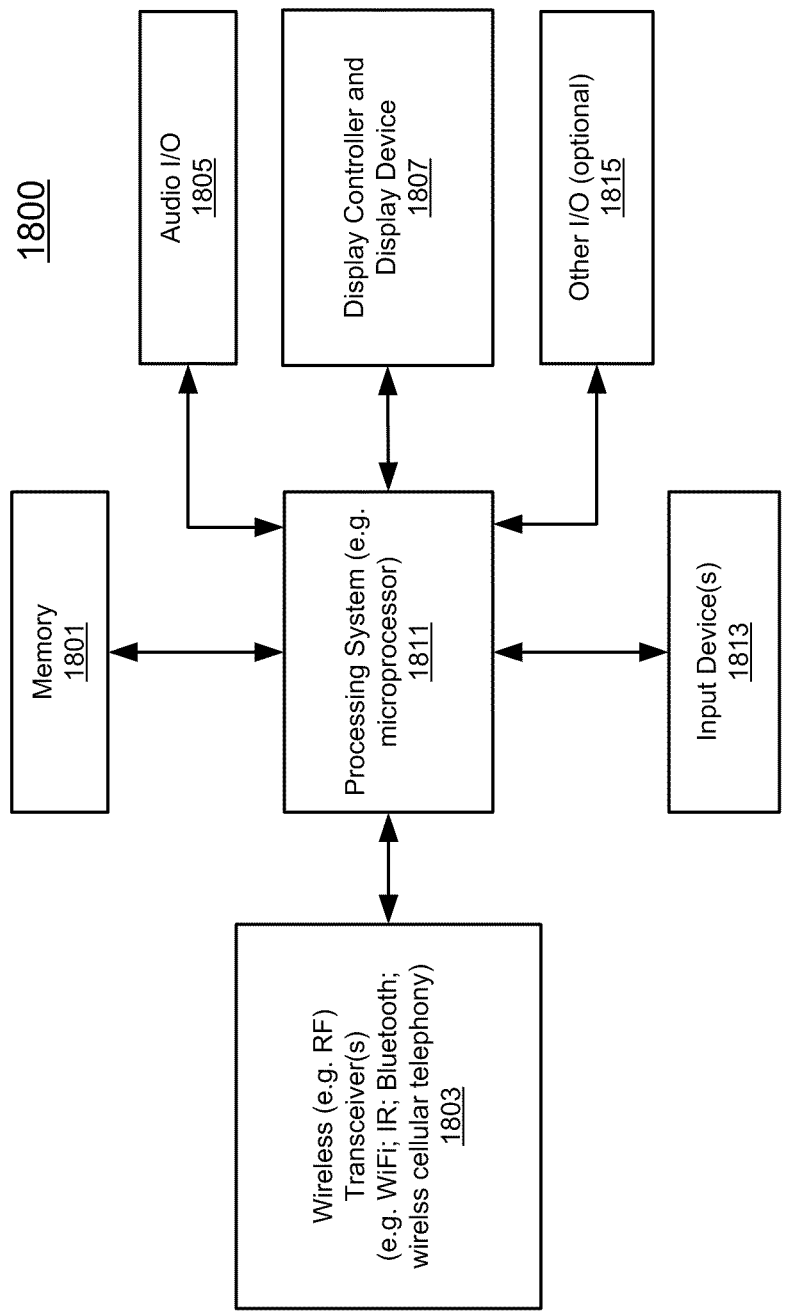
FIG. 18 shows an example of a data processing system which may be used with one embodiment of the present invention.

FIG. 18 shows an example of a data processing system which may be used with one embodiment of the present invention. For example, system 1800 may be implemented as any one of devices 101-103 as shown in FIG. 1. The data processing system 1800 shown in FIG. 18 includes a processing system 1811, which may be one or more microprocessors, or which may be a system on a chip of integrated circuit, and the system also includes memory 1801 for storing data and programs for execution by the processing system. The system 1800 also includes an audio input/output subsystem 1805 which may include a microphone and a speaker for, for example, playing back music or providing telephone functionality through the speaker and microphone.

A display controller and display device 1807 provide a visual user interface for the user; this digital interface may include a graphical user interface which is similar to that shown on an iPhone® phone device, an iPad device, or on a Macintosh computer when running operating system software. The system 1800 also includes one or more wireless transceivers 1803 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 1800 in certain embodiments, and in certain embodiments fewer components than shown in FIG. 18 may also be used in a data processing system.

The data processing system 1800 also includes one or more input devices 1813 which are provided to allow a user to provide input to the system. These input devices may be a keypad, a keyboard, a touch panel, or a multi touch panel. The data processing system 1800 also includes an optional input/output device 1815 which may be a connector for a dock. It will be appreciated that one or more buses, not shown, may be used to interconnect the various components as is well known in the art. The data processing system shown in FIG. 18 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1800 may be a network computer or an embedded processing device within another device, or other types of data processing systems which have fewer components or perhaps more components than that shown in FIG. 18.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod®, or iPod Nano® media player from Apple Inc. of Cupertino, Calif., a touch screen or multi-touch input device, pushbutton device, movable pointing input device or other input device. The media selection device may be used to select the media stored on the storage device and/or a remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for advertising a service in a peer-to-peer networking environment, the method comprising:
   monitoring operating conditions of a local device coupled to a peer-to-peer wireless network;
   dynamically adjusting an advertisement period based on at least one of a battery condition of the local device, network traffic condition of the peer-to-peer wireless network, a location of the local device, a change in the location of the local device, an amount of user activity on the local device, a first number of devices on the peer-to-peer wireless network, and a second number of devices with active users on the peer-to-peer wireless network; and
   broadcasting, by the local device, an advertisement frame in the peer-to-peer wireless network according to the adjusted advertisement period, the advertisement frame including one or more service IDs for identifying one or more services to be advertised from the local device.

2. The method of claim 1, further comprising:
   dynamically adjusting a discovery period based on the operating conditions of the local device; and
   listening, by the local device, in the peer-to-peer wireless network according to the adjusted discovery period in an attempt to receive an advertisement frame from a remote device over the peer-to-peer wireless network.

3. The method of claim 2, wherein the discovery period is dynamically adjusted based on at least one of a battery condition of the local device, a user behavior of the local device, network traffic condition, and a type of service to be discovered.

4. The method of claim 2, wherein the advertisement period is calculated as a product of a predetermined base value and a first adjustment factor, and wherein the advertisement period is dynamically adjusted by adjusting the first adjustment factor.

5. The method of claim 4, wherein the discovery period is calculated as a product of the predetermined base value and a second adjustment factor that is different than the first adjustment factor, and wherein the discovery period is dynamically adjusted by adjusting the second adjustment factor.

6. The method of claim 1, wherein the dynamic adjustment of the advertisement period is based on the battery condition of the local device, network traffic condition of the peer-to-peer wireless network, the location of the local device, the amount of user activity on the local device, the first number of devices on the peer-to-peer wireless network, and the second number of devices with active users on the peer-to-peer wireless network; and
   wherein the dynamic adjustment of the advertisement period comprises increasing the advertisement period.

7. A non-transitory machine-readable storage medium having instructions stored therein, which when executed by a machine, cause the machine to perform a method for advertising a service in a peer-to-peer networking environment, the method comprising:
   monitoring operating conditions of a local device coupled to a peer-to-peer wireless network;
   dynamically adjusting an advertisement period based on at least one of a battery condition of the local device, network traffic condition of the peer-to-peer wireless network, a location of the local device, a change in the location of the local device, an amount of user activity on the local device, a first number of devices on the peer-to-peer wireless network, and a second number of devices with active users on the peer-to-peer wireless network; and
   broadcasting, by the local device, an advertisement frame in the peer-to-peer wireless network according to the adjusted advertisement period, the advertisement frame including one or more service IDs for identifying one or more services to be advertised from the local device.

8. The non-transitory machine-readable storage medium of claim 7, wherein the method further comprises:
   dynamically adjusting a discovery period based on the operating conditions of the local device; and
   listening, by the local device, in the peer-to-peer wireless network according to the adjusted discovery period in an attempt to receive an advertisement frame from a remote device over the peer-to-peer wireless network.

9. The non-transitory machine-readable storage medium of claim 8, wherein the discovery period is dynamically adjusted based on at least one of a battery condition of the local device, a user behavior of the local device, network traffic condition of the peer-to-peer wireless network, and a type of service to be advertised.

10. The non-transitory machine-readable storage medium of claim 8, wherein the advertisement period is calculated as a product of a predetermined base value and a first adjustment factor, and wherein the advertisement period is dynamically adjusted by adjusting the first adjustment factor.

11. The non-transitory machine-readable storage medium of claim 10, wherein the discovery period is calculated as a product of the predetermined base value and a second adjustment factor that is different than the first adjustment factor, and wherein the discovery period is dynamically adjusted by adjusting the adjustment factor.

12. A portable device, comprising:

a wireless transceiver;

a monitor coupled to the wireless transceiver to monitor operating conditions of the portable device coupled to a peer-to-peer wireless network; and a service advertisement unit coupled to the monitor and the wireless transceiver, to:

dynamically adjust an advertisement period based on at least one of a battery condition of the portable device, network traffic condition of the peer-to-peer wireless network, a location of the portable device, a change in the location of the portable device, an amount of user activity on the portable device, a first number of devices on the peer-to-peer wireless network, and a second number of devices with active users on the peer-to-peer wireless network; and broadcast an advertisement frame according to the adjusted advertisement period, via the wireless transceiver, in the peer-to-peer wireless network, the advertisement frame including one or more service identifiers (IDs) identifying one or more services to be advertised.

13. The portable device of claim 12, wherein at least one of the advertisement period and the discovery period is dynamically adjusted based on at least one of a battery condition of the local device, a user behavior of the local device, network traffic condition of the peer-to-peer wireless network, and a type of service to be advertised or discovered.

14. The portable device of claim 12, wherein the advertisement period is calculated as a product of a predetermined base value and a first adjustment factor, and wherein the advertisement period is dynamically adjusted by adjusting the first adjustment factor.

15. The portable device of claim 14, wherein the discovery period is calculated as a product of the predetermined base value and a second adjustment factor that is different than the first adjustment factor, and wherein the discovery period is dynamically adjusted by adjusting the second adjustment factor.

16. A machine-implemented method for discovering a service in a peer-to-peer networking environment, the method comprising:

determining operating conditions of a local device coupled to a peer-to-peer wireless network;

dynamically adjusting a discovery period based on at least one of a battery condition of the local device, network traffic condition of the peer-to-peer wireless network, a location of the local device, a change in the location of the local device, an amount of user activity on the local device, a first number of devices on the peer-to-peer wireless network, and a second number of devices with active users on the peer-to-peer wireless network; and listening, by the local device, in the peer-to-peer wireless network according to the adjusted discovery period in an attempt to discover a service advertised by a remote device by receiving an advertisement frame from the remote device over the peer-to-peer wireless network.

17. The method of claim 16, further comprising:

dynamically adjusting an advertisement period based on the operating conditions of the local device; and broadcasting, by the local device, an advertisement frame in the peer-to-peer wireless network according to the adjusted advertisement period, the advertisement frame including one or more service identifiers (IDs) identifying one or more services to be advertised from the local device.

18. A non-transitory machine-readable storage medium having instructions stored therein, which when executed by a machine, cause the machine to perform a method for advertising a service in a peer-to-peer networking environment, the method comprising:

determining operating conditions of a local device coupled to a peer-to-peer wireless network;

dynamically adjusting a discovery period based on at least one of a battery condition of the local device, network traffic condition of the peer-to-peer wireless network, a location of the local device, a change in the location of the local device, an amount of user activity on the local device, a first number of devices on the peer-to-peer wireless network, and a second number of devices with active users on the peer-to-peer wireless network; and listening, by the local device, in the peer-to-peer wireless network according to the adjusted discovery period in an attempt to discover a service advertised by a remote device by receiving an advertisement frame from the remote device over the peer-to-peer wireless network.

19. The non-transitory machine-readable storage medium of claim 18, wherein the method further comprises:

dynamically adjusting an advertisement period based on the operating conditions of the local device; and broadcasting, by the local device, an advertisement frame in the peer-to-peer wireless network according to the adjusted advertisement period, the advertisement frame including one or more service identifiers (IDs) identifying one or more services to be advertised from the local device.

20. A portable device, comprising:

a wireless transceiver;

a monitor coupled to the wireless transceiver to determine operating conditions of the portable device; and a service discovery unit coupled to the monitor and the wireless transceiver, to:

dynamically adjust a discovery period based on at least one of a battery condition of the portable device, network traffic condition, a location of the portable device, a change in the location of the portable device, an amount of user activity on the portable device, a first number of devices on the network, and a second number of devices with active users on the network; and listen in the peer-to-peer wireless network according to the adjusted discovery period in an attempt to discovery a service advertised by a remote device over a peer-to-peer wireless network.

21. The portable device of claim 20, further comprising a service advertisement unit coupled to the monitor and wireless transceiver to dynamically adjust an advertisement period based on the operating conditions, and broadcast an advertisement frame in the peer-to-peer wireless network according to the adjusted advertisement period, the advertisement frame including one or more service identifiers (IDs) identifying one or more services to be advertised.

* * * * *